United States Patent
Mohammed et al.

(10) Patent No.: US 12,305,488 B1
(45) Date of Patent: May 20, 2025

(54) HYDROGEN STORAGE AND RECOVERY WITH IRON-RICH SEDIMENTS

(71) Applicant: KING FAHD UNIVERSITY OF PETROLEUM AND MINERALS, Dhahran (SA)

(72) Inventors: Isah Mohammed, Dhahran (SA); Dhafer Abdullah Al Shehri, Dhahran (SA); Abubakar Isah, Dhahran (SA); Mohamed Mahmoud, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 18/763,426

(22) Filed: Jul. 3, 2024

(51) Int. Cl.
*E21B 41/00* (2006.01)
*C01B 3/00* (2006.01)
*C09K 8/66* (2006.01)

(52) U.S. Cl.
CPC .......... *E21B 41/0057* (2013.01); *C01B 3/001* (2013.01); *C09K 8/66* (2013.01)

(58) Field of Classification Search
CPC ........ E21B 41/0057; C01B 3/001; C09K 8/66
See application file for complete search history.

(56) References Cited

U.S. PATENT DOCUMENTS

2007/0298479 A1* 12/2007 Larter .................. B09C 1/10 435/168
2023/0391614 A1* 12/2023 Johnson ................ C01B 3/001
2023/0392485 A1   12/2023 Johnson et al.

FOREIGN PATENT DOCUMENTS

KR          101543322 B1 *  8/2015 ............ B01D 53/14
KR    10-2023-0025095        2/2023
WO       2022/232630 A1     11/2022

OTHER PUBLICATIONS

Zhan et al.; Geochemical modelling on the role of redox reactions during hydrogen underground storage in porous media; International Journal of Hydrogen Energy 50; Jul. 12, 2023; 17 Pages.
Yekta et al.; Evaluation of geochemical reactivity of hydrogen in sandstone: Application to geological storage; Applied Geochemistry; May 25, 2018; 34 Pages.
Zhang et al.; Study on the impact of hydrogen storage temperature on iron-based thermochemical hydrogen storage technology; Chemical Engineering Journal, vol. 490; May 2, 2024; 4 Pages.

* cited by examiner

*Primary Examiner* — Crystal J Lee
(74) *Attorney, Agent, or Firm* — Oblon, McClelland, Maier & Neustadt, L.L.P.

(57) ABSTRACT

A method of hydrogen storage and recovery includes injecting saline water into a subterranean gas storage cell in a subterranean geologic formation, including magnetite. The method further includes injecting a gas mixture having hydrogen gas at a positive pressure into the subterranean gas storage cell, and then storing a portion of the hydrogen gas in the magnetite under a storage condition. At least a portion of hydrogen is desorbed of the hydrogen gas from the magnetite by injecting a chelating solution into the subterranean gas storage cell.

12 Claims, 24 Drawing Sheets

HYDROGEN STORAGE AND RECOVERY WITH IRON-RICH SEDIMENTS

BACKGROUND

Technical Field

The present disclosure is directed to hydrogen ($H_2$) recovery and storage and, more particularly, directed to a method of hydrogen storage and recovery using magnetite, a method of hydrogen storage using pyrite and a method of hydrogen storage using hematite.

Description of Related Art

The "background" description provided herein is to present the context of the disclosure generally. Work of the presently named inventors, to the extent it is described in this background section, as well as aspects of the description that may not otherwise qualify as prior art at the time of filing, are neither expressly nor impliedly admitted as prior art against the present invention.

With the advent of technology and population, greenhouse gas emissions from human activity are becoming increasingly detrimental to the environment. Numerous financial resources are invested every year by a plurality of nations and organizations to reduce their carbon footprint. Hence, there is a need for an alternative to fossil fuels. Currently, hydrogen is a promising alternative, given its advantages and minimal impact on the environment. Hydrogen reacts with oxygen in a fuel cell to produce power which may be used to drive cars, with the end product being water vapor. However, as a fuel, it has certain drawbacks, including its lightweight and highly combustible nature. As a result, large investments in fire safety systems are needed. The fact that hydrogen is difficult to handle and needs considerable compression in the range of about 350 bar to 700 bar to be conveniently stored in tanks for lengthy trips is another disadvantage of using hydrogen as an automotive fuel. Further, transportation of hydrogen is challenging as pipelines intended for natural gas and methane cannot be utilized for hydrogen unless the concentration of hydrogen is extremely low. Furthermore, a sustainable supply of hydrogen as a fuel is also needed.

Therefore, a solution for hydrogen storage has drawn much attention. Recently, the prospect of geo-storing hydrogen has been explored. Similar to the storage of carbon dioxide ($CO_2$), bulk and adsorbed storage of hydrogen is being considered. Several researchers have examined various rocks in the context of bulk storage, including, but not limited to, sandstone, clays, coal, carbonates, and basalt, for potential hydrogen storage. In particular, rocks of low permeability, primarily found as caprocks including anhydrite and shales, has also been researched. Storage capability and wettability of certain rocks have been evaluated, by hydrogen and permeability of hydrogen through the aforementioned minerals. The purpose is to investigate how a cushion gas can help with hydrogen storage (See: Muhammed N S, Haq B, Al Shehri D.: Role of methane as a cushion gas for hydrogen storage in depleted gas reservoirs, Gbadamosi A O, Muhammed N S, Patil S, Al Shehri D, Haq B, Epelle E I, and coworkers: Underground hydrogen storage: A critical assessment of fluid-fluid and fluid-rock interactions., and Muhammed N S, Gbadamosi A O, Epelle E I, Abdulrasheed A A, Haq B, Patil S, and coworkers: Hydrogen production, transportation, utilization, and storage: Recent advances towards sustainable energy). This research assesses the storage potential of various gas combinations, including $CO_2$, methane, nitrogen, and the like. The factors employed to evaluate storage potential for the aforementioned studies are the IFT and contact angle of the hydrogen gas with various substrates. Further, possible interactions between hydrogen and iron have been the subject of numerous research, many of which used computational and experimental methods to assess the interactions (See: Liu J, Yang T, Peng Q, Yang Y, Li Y-W, Wen X-D. Theoretical exploration of the interaction between hydrogen and pyrite-type FeS2 surface, Al-Harbi A, Al-Marri M, Carchini G, Saad M, Hussein I A. Hydrogen underground storage in Silica-Clay Shales: experimental and density functional theory investigation, and Lu T, Xu Y-P, Pan X-D, Zhou H-S, Ding F, Yang Z, and coworkers: Atomistic study of hydrogen behavior around dislocations in a iron). Furthermore, iron embrittlement has been focused upon, despite indications of hydrogen interactions with iron (See: Sturges C M, Miodownik A P. The interaction of hydrogen and dislocations in iron).

Despite extensive research in the literature, the $H_2$-iron system has not been examined in a manner that offers a solution to the hydrogen storage issue. More specifically, studies on subterranean hydrogen storage have focused primarily on retrieving the stored hydrogen and minimizing hydrogen loss. Thus, how to securely inject and store hydrogen underneath a subterranean geological formation remains elusive. This is important since the fuel that may be utilized daily needs to be produced in advance and stored for later use. Because of this, if hydrogen is to be used in place of fossil fuels, consideration of efficient ways to store and extract hydrogen is of paramount importance. Hence, there arises a need for an efficient and effective method of adsorption of hydrogen on a material in order to facilitate transportation.

US20230392485A1 discloses a method of producing hydrogen from a subsurface iron-rich rock formation by heating a fluid, such as dihydrogen sulfide and carbon dioxide, within the rock formation to stimulate an exothermic reaction of the fluid with components of the rock formation and producing hydrogen. KR2023025095A is directed to a method of detecting a region where natural hydrogen exists. WO2022232630A1 discloses a method of storing hydrogen by injecting an aqueous mixture into a subterranean reservoir. The aqueous mixture includes water and a carboxylate, and, optionally, a chelating agent. Hydrogen is stored in the form of a carboxylate in the subterranean reservoir.

Each of the aforementioned publications and methods suffers from one or more drawbacks hindering their adoption. Accordingly, it is one object of the present disclosure to provide methods for hydrogen storage and recovery.

SUMMARY

In an exemplary embodiment, a method of hydrogen storage and recovery is described. The method includes injecting saline water into a subterranean gas storage cell in a subterranean geologic formation, including magnetite. The method further includes injecting a gas mixture having hydrogen gas at a positive pressure into the subterranean gas storage cell. The method further includes storing a portion of the hydrogen gas in the magnetite under a storage condition and desorbing a part of the portion of the hydrogen gas from the magnetite by injecting a chelating solution into the subterranean gas storage cell.

In some embodiments, the chelating solution includes at least one iron chelator selected from the group consisting of ethylenediaminetetraacetic acid (EDTA), ethyleneglycol-O, O'-bis(2-aminoethyl)-N, N,N', N'-tetraacetic acid (EGTA), N-(2-hydroxyethyl)ethylenediaminetriacetic acid (HEDTA), nitrilotriacetic acid (NTA), deferoxamine, deferasirox and deferiprone.

In some embodiments, the chelating solution includes EDTA.

In some embodiments, the chelating solution includes 0.1-2.0 mol. % of EDTA.

In some embodiments, the saline water includes ions of $Na^+$, $Ca^{2+}$, $Mg^{2+}$, $SO_4^{2-}$, $Cl^-$ and $HCO_3^-$.

In some embodiments, the saline water includes, by mass, ions of, $Na^+$: 5,000-50,000 parts per million (ppm), $Ca^{2+}$: 100-1,500 ppm, $Mg^{2+}$: 500-5,000 ppm, $SO_4^{2-}$: 1,000-9,000 ppm, $Cl^-$: 10,000-90,000 ppm, and $HCO_3^-$: 10-500 ppm.

In some embodiments, a volume of the saline water injected is 0.1-0.9 times of a volume the subterranean gas storage cell.

In some embodiments, the storage condition includes keeping the ions in the subterranean gas storage cell.

In some embodiments, the aforementioned method further includes injecting the saline water and the gas mixture at a depth in the subterranean gas storage cell such that the subterranean gas storage cell has an average temperature of 60-150° C.; as such, the storage condition includes the average temperature of 60-150° C. of the subterranean gas storage cell.

In some embodiments, the positive pressure is 100-2000 psi.

In some embodiments, the subterranean geologic formation includes 50 percent by mass (mass %) to 100 mass % of magnetite based on a total mass of the subterranean geologic formation.

In some embodiments, the subterranean geologic formation includes 50 mass % to 90 mass % of $Fe_3O_4$ based on a total mass of the subterranean geologic formation.

In some embodiments, the subterranean geologic formation further includes 20-35 mass % of $SiO_2$ based on a total mass of the subterranean geologic formation.

In another exemplary embodiment, a method of hydrogen storage is described. The method of hydrogen includes injecting saline water into a subterranean gas storage cell in a subterranean geologic formation including mainly pyrite. The method further includes injecting a chelating solution, including ethylenediaminetetraacetic acid (EDTA), into the subterranean gas storage cell. The method further includes injecting a gas mixture, including hydrogen gas at a positive pressure, into the subterranean gas storage cell and storing a portion of the hydrogen gas in the pyrite under a storage condition.

In some embodiments, the saline water includes, by mass, ions of, $Na^+$: 5,000-50,000 ppm, $Ca^{2+}$: 100-1,500 ppm, $Mg^{2+}$: 500-5,000 ppm, $SO_4^{2-}$: 1,000-9,000 ppm, Cl: 10,000-70,000 ppm, and $HCO_3^-$: 10-500 ppm.

In some embodiments, the chelating solution includes 0.1 percent by mole (mol. %) to 2.0 mol. % of EDTA, and the positive pressure is 100 pounds per square inch (psi) to 2000 psi.

In some embodiments, the method of hydrogen storage further includes injecting the saline water and the gas mixture at a depth in the subterranean gas storage cell such that the subterranean gas storage cell has an average temperature of 60-150° C., as such, the storage condition includes the average temperature of 60-150° C. of the subterranean gas storage cell.

In another exemplary embodiment, another method of hydrogen storage is described. The method includes injecting a chelating solution, including EDTA, into a subterranean gas storage cell in a subterranean geologic formation, including mainly dry hematite. The method further includes injecting a gas mixture, including hydrogen gas, at a positive pressure into the subterranean gas storage cell and storing a portion of the hydrogen gas in the hematite under a storage condition.

In some embodiments, the chelating solution includes 0.1 mol. % to 2.0 mol. % of EDTA, and the positive pressure is 100 psi to 2000 psi.

In some embodiments, the aforementioned method further includes injecting the chelating solution and the gas mixture at a depth in the subterranean gas storage cell such that the subterranean gas storage cell has an average temperature of 60-150° C., the storage condition includes the average temperature of 60-150° C. of the subterranean gas storage cell.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
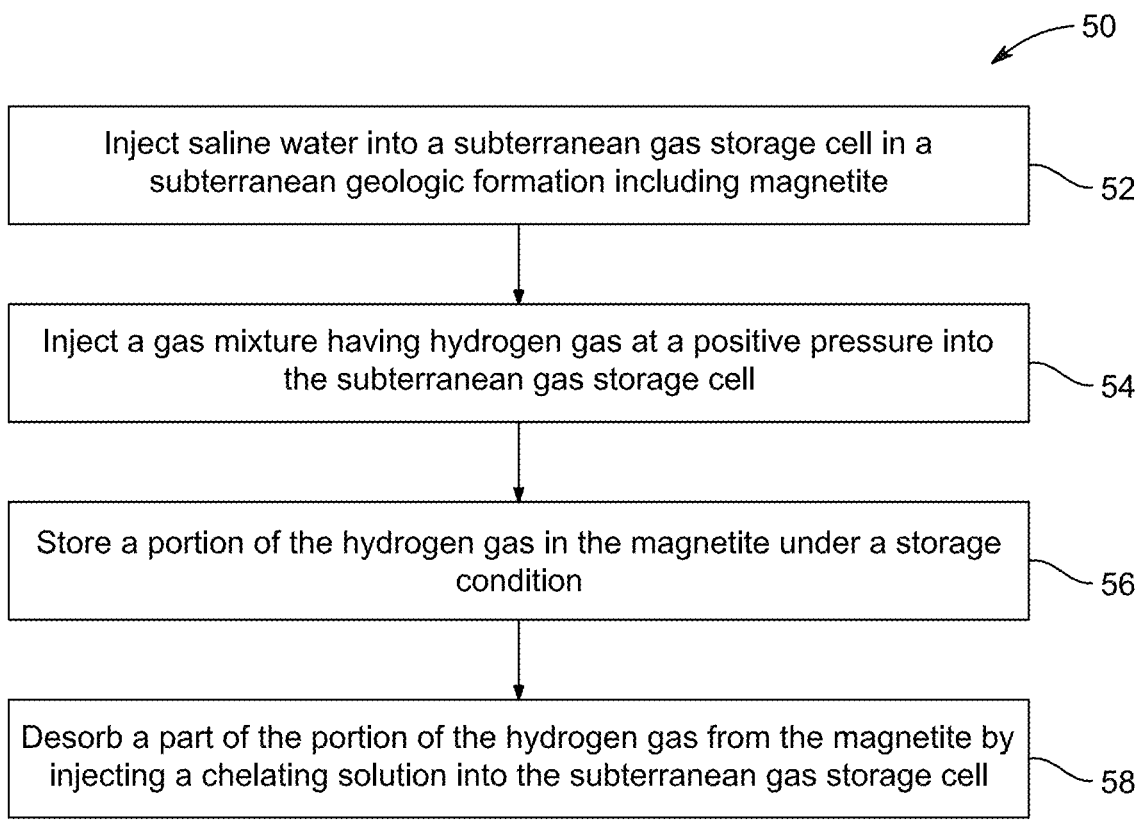
FIG. 1A is a schematic flowchart of a process of hydrogen storage and recovery, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, the term 'subterranean geological formation' refers to any geological structure or feature that exists beneath the Earth's surface. These formations can encompass a wide range of geological features, such as caves, caverns, aquifers, oil and gas reservoirs, mineral deposits, and various types of rock formations.

A subterranean geological formation may include, but is not limited to, a depleted oil reservoir, a depleted gas reservoir, a sour reservoir, a hydrocarbon-bearing subterranean formation, a saline formation, or an un-minable coal bed. The subterranean geologic formation may include a wellbore with a surface opening. The wellbore may be formed in the subterranean geologic formation by known techniques. The wellbore may be drilled in the subterranean geologic formation to aid in the exploration and extraction of a formation fluid (also known as 'naturally present formation fluids') from the subterranean geologic formation. The formation fluid may include water, crude oil, gas, or a combination thereof. In other words, the subterranean geologic formation may be processed to produce water, crude oil, gas, or a mixture of these fluids. For extraction of formation fluid, the wellbore may be provided with multiple perforations. These perforations may be in the form of a hole (openings) formed in a casing or liner of the wellbore to create channels for allowing the flow of the formation fluid from the subterranean geologic formation into the wellbore. The perforations may be formed uniformly or non-uniformly along a length of the wellbore without any limitations.

A subterranean gas storage cell, also known as an underground gas storage facility or cavern, is a type of infrastructure used for storing natural gas underground. Types of subterranean gas storage cells may include, but are not limited to, depleted gas fields, salt caverns, aquifer storage, and lined rock caverns.

As used herein, the term 'saline water' refers to water that contains dissolved salts, typically sodium chloride (table salt) and other minerals. This type of water is commonly found in oceans, seas, saltwater lakes, and saline aquifers. It can also occur in certain inland bodies of water where evaporation rates exceed precipitation rates, leading to the concentration of salts.

FIG. 1A illustrates a schematic flow chart of a method 50 of hydrogen storage and recovery. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes injecting saline water into a subterranean gas storage cell in a subterranean geologic formation, including magnetite. In some embodiments, the saline water may be substituted by tap water, distilled water, ionized water, hard water, or fresh water, which may include naturally present and/or additionally added salts of sodium, magnesium, calcium, potassium, ammonium, and iron, and anions such as chloride, bicarbonate, carbonate, sulfate, sulfite, phosphate, iodide, nitrate, acetate, citrate, fluoride, and/or nitrite. In some embodiments, the saline water includes ions of $Na^+$, $Ca^{2+}$, $Mg^{2+}$, $SO_4^{2-}$, $Cl^-$, and $HCO_3^-$. The saline water may or may not include $CO_3^{2-}$.

In some embodiments, the saline water includes, by mass, ions of, $Na^+$: 5,000-50,000 parts per million (ppm), more preferably 15,000-20,000 ppm, and yet more preferably 18,300 ppm; $Ca^{2+}$: 100-1,500 ppm, more preferably 600-

700 ppm, and yet more preferably 650 ppm; $Mg^{2+}$: 500-5,000 ppm, more preferably 1,500-3,000 ppm, and yet more preferably 2,110 ppm; $SO_4^{2-}$: 1,000-9,000 ppm, more preferably 4,000-5,000 ppm, and yet more preferably 4,290 ppm; $Cl^-$: 10,000-70,000 ppm, more preferably 20,000-40,000 ppm, and yet more preferably 32,200 ppm; and $HCO_3^-$: 10-500 ppm, more preferably 100-150 ppm, and yet more preferably 120 ppm.

In some embodiments, the volume of the saline water injected is 0.1-0.9 times, preferably 0.3-0.7 times, preferably 0.4-0.5 times the volume of the subterranean gas storage cell. In some embodiments, brine is naturally present in a reservoir so the method 50 of the present disclosure may be performed without injecting saline water. In some embodiments, the method of the present disclosure may be performed in situ.

In some embodiments, the depth of the subterranean gas storage cell is determined prior to injecting the saline water such that the subterranean gas storage cell has an average temperature of 60-150° C., more preferably 70-90° C., and yet more preferably about 80° C. That is, the temperature of the subterranean gas storage cell is related to or determined by the depth of the subterranean gas storage cell. Typically, the gas storage cells are located at a depth of about 200 meters (m) to approximately 3000-3500 m, preferably 500-2000 m, preferably 1000-1500 m, below the ground level; the depth of which may be dependent on several factors such as nature of rock, environment, mineralogy, etc. The depth is determined by methods conventionally known in the art. It is preferred that the subterranean geologic formation includes 50 percent by mass (mass %) to 100 mass %, preferably 60 mass % to 90 mass %, preferably 65 mass % to 80 mass %, preferably about 69 mass % of magnetite, based on a total mass of the subterranean geologic formation. In some embodiments, the subterranean geologic formation includes 50 mass % to 90 mass %, more preferably 65-75 mass %, and yet more preferably 69 mass % of $Fe_3O_4$, based on the total mass of the subterranean geologic formation. In some embodiments, the subterranean geologic formation further includes 20-35 mass %, more preferably 25-32 mass %, and yet more preferably 28.3 mass % of $SiO_2$, based on the total mass of the subterranean geologic formation. Such mass percentages can be determined by XRD analysis, for example as will be shown later in Table 1.

In a specific embodiment, the subterranean geologic formation predominantly includes magnetite, preferably about 60-70 mass %, preferably 65-69 mass %, or more preferably about 69 mass % of magnetite; 1-5 mass % of vermiculite, preferably 2-4 mass %, preferably 2-3 mass %, or more preferably about 2.8 mass % of vermiculite; and 25-30 mass % of quartz, preferably 26-29 mass %, and most preferably about 28.3 mass % of quartz, based on the total mass of the subterranean geologic formation. In some embodiments, the subterranean geologic formation may also include other minerals like pyrite, hematite, or a combination thereof.

In some embodiments, a fracking treatment can be performed to render the subterranean gas storage cell more porous prior to step 52. A pressurized liquid (including water and containing sand or other proppants suspended with the aid of thickening agents) can be injected to create cracks in the subterranean gas storage cell. The cracks will allow fluids (liquid and gas) to flow more freely in the subterranean gas storage cell. In some embodiments, the fracking treatment can be performed in conjunction with step 52. For instance, the pressurized liquid may contain the saline water. In other words, the pressurized liquid may contain water and the ions as discussed above.

In some embodiments, a heat treatment can be performed on the subterranean gas storage cell to remove excessive water as a result of injecting the saline water and the chelating solution, prior to step 76. The heat treatment can therefore unblock or unclog the subterranean gas storage cell. However, the heat treatment should not completely dry the subterranean gas storage cell. For example, the heat treatment can be terminated when there is no visible water droplet presence. The heat treatment can be terminated so that the subterranean gas storage cell contains 1-15 mass %, preferably 3-10 mass %, preferably 5-7 mass % of water based on the total mass of the subterranean gas storage cell.

In some embodiments, the subterranean gas storage cell may be purged with an inert gas/nitrogen/vacuumed, e.g., for 1 minute to 4 hours, preferably 10 minutes to 2 hours, preferably 30 minutes to 1 hour, to remove any trapped air prior to step 54. For example, an oxygen concentration due to the trapped air can be monitored. The purging or vacuuming can be terminated when the oxygen concentration the subterranean gas storage cell is below 50 mg/L, preferably below 25 mg/L, preferably below 10 mg/L, preferably below 5 mg/L.

At step 54, the method 50 includes injecting a gas mixture of hydrogen gas at a positive pressure into the subterranean gas storage cell. The gas mixture includes at least 50% hydrogen, preferably 55%, preferably 60%, preferably 65%, preferably 70%, preferably 75%, preferably 80%, preferably 85%, preferably at least 90% of the total weight of the gas mixture. The gas mixture is injected into the subterranean gas storage cell at a positive pressure in the range of 100-2000 pounds per square inch (psi), preferably 500-1200, preferably 600-1100 psi, 700-1050 psi, preferably 800-1000 psi, preferably about 1000 psi.

At step 56, the method 50 includes storing a portion of the hydrogen gas in the magnetite under a storage condition. Under pre-defined conditions, as discussed above, at least a portion of the hydrogen gas, preferably about 100-700 mg, preferably 170-670 mg, preferably 250-670 mg, preferably about 600-660 mg, more preferably about 655 mg of hydrogen is absorbed per gram of magnetite (the composition of magnetite as described earlier). In some embodiments, the storage condition includes keeping the ions in the subterranean gas storage cell.

At step 58, the method 50 includes desorbing a part of the portion of the hydrogen gas from the magnetite by injecting a chelating solution into the subterranean gas storage cell. Desorption is accomplished by adding a chelating solution into the subterranean gas storage cell. The chelating solution containing chelating agents is capable of forming complexes with metal ions by surrounding them and binding them tightly. In some embodiments, the chelating solution includes at least one iron chelator selected from the group consisting of ethylenediaminetetraacetic acid (EDTA), ethyleneglycol-O, O'-bis(2-aminoethyl)-N, N,N', N'-tetraacetic acid (EGTA), N-(2-hydroxyethyl)ethylenediaminetriacetic acid (HEDTA), nitrilotriacetic acid (NTA), deferoxamine, deferasirox and deferiprone. In some embodiments, the chelating solution may include, but is not limited to, diethylenetriaminepentaacetic acid (DTPA), citric acid, phosphonate solution. In a preferred embodiment, the chelating solution includes EDTA. The concentration of iron chelator, for example, EDTA, in the chelating solution is about 0.1-2.0 mol. %, preferably 0.5-1.5 mol. %, preferably 0.7-1.2 mol. %. In some embodiments, the volume of the chelating solution injected is 0.1-0.9 times, preferably 0.3-0.7 times, preferably 0.4-0.5 times the volume of the subterranean gas storage cell.

Figure 1B:
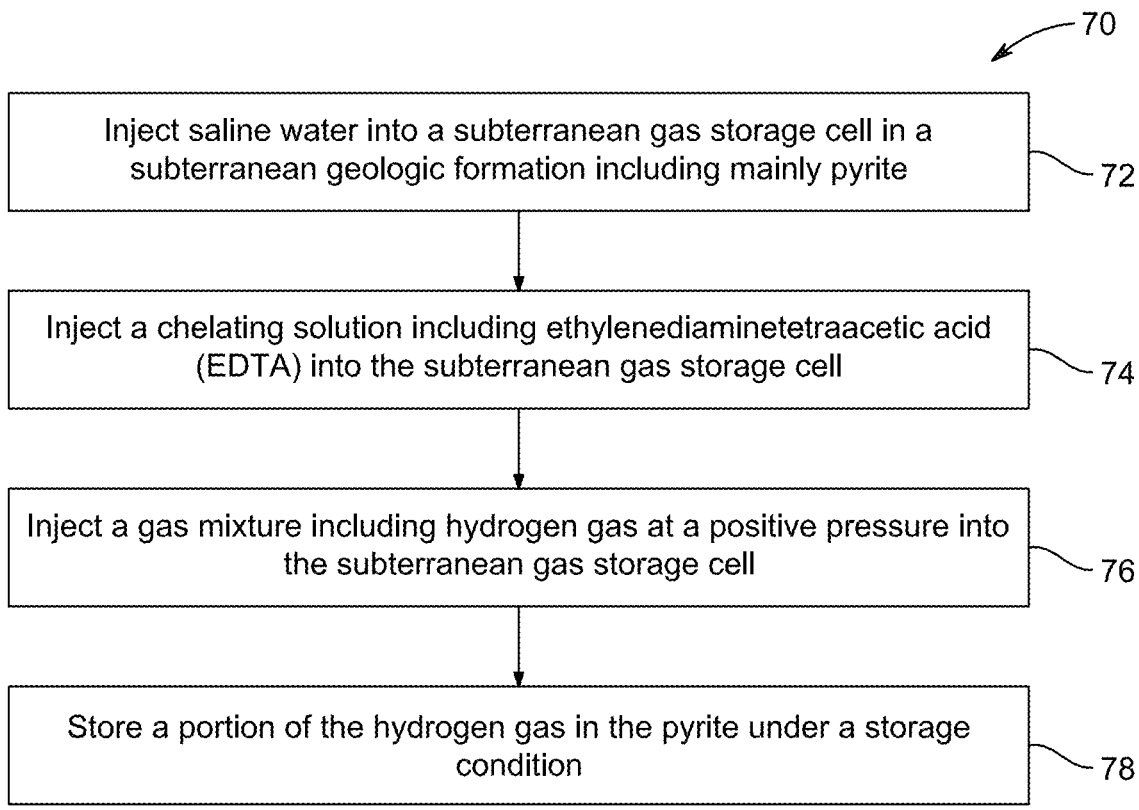
FIG. 1B is a schematic flowchart of a process of hydrogen storage, according to an embodiment.

FIG. 1B illustrates a schematic flow chart of a process 70 of hydrogen storage. The order in which the process 70 is described is not intended to be construed as a limitation, and any number of the described process steps can be combined in any order to implement the process 70. Additionally, individual steps may be removed or skipped from the process 70 without departing from the spirit and scope of the present disclosure.

At step 72, the process 70 includes injecting saline water into a subterranean gas storage cell in a subterranean geologic formation, including mainly pyrite. In some embodiments, the saline water includes, by mass, ions of, $Na^+$: 5,000-50,000 parts per million (ppm), more preferably 15,000-20,000 ppm, and yet more preferably 18,300 ppm; $Ca^{2+}$: 100-1,500 ppm, more preferably 600-700 ppm, and yet more preferably 650 ppm; $Mg^{2+}$: 500-5,000 ppm, more preferably 1,500-3,000 ppm, and yet more preferably 2,110 ppm; $SO_4^{2-}$: 1,000-9,000 ppm, more preferably 4,000-5,000 ppm, and yet more preferably 4,290 ppm; $Cl^-$: 10,000-70,000 ppm, more preferably 20,000-40,000 ppm, and yet more preferably 32,200 ppm; and $HCO_3^-$: 10-500 ppm, more preferably 100-150 ppm, and yet more preferably 120 ppm. The saline water may or may not include $CO_3^{2-}$. In some embodiments, the volume of the saline water injected is 0.1-0.9 times, preferably 0.3-0.7 times, preferably 0.4-0.5 times the volume of the subterranean gas storage cell. In some embodiments, brine is naturally present in a reservoir so the method 70 may be performed without injecting the saline water into the subterranean gas storage cell.

In some embodiments, the depth of the subterranean gas storage cell is determined prior to injecting the saline water such that the subterranean gas storage cell has an average temperature of 60-150° C., more preferably 70-90° C., and yet more preferably about 80° C. Typically, the gas storage cells are located at a depth of about 200 meters (m) to approximately 3000-3500 m, preferably 500-2000 m, preferably 1000-1500 m below the ground level; the depth of which may be dependent on several factors such as nature of rock, environment, mineralogy, etc. The depth is determined by methods conventionally known in the art. In a specific embodiment, the subterranean gas storage cell includes about 70-90% FeS2, preferably about 80-85% FeS2, more preferably about 82-83% FeS2, and 10-30 mass % of $SiO_2$, preferably 15-20 mass %, and most preferably about 17-18 mass % of $SiO_2$, based on the total mass of the subterranean geologic formation.

At step 74, the process 70 includes injecting a chelating solution, including ethylenediaminetetraacetic acid (EDTA), into the subterranean gas storage cell. Optionally, other chelating agents, as mentioned earlier, can be used alone or in combination with EDTA. In some embodiments, the chelating solution includes 0.1 percent by mole (mol. %) to 2.0 mol. %, preferably 0.5-1.5 mol. %, preferably 0.7-1.2 mol. % of EDTA. In some embodiments, the volume of the chelating solution injected is 0.1-0.9 times, preferably 0.3-0.7 times, preferably 0.4-0.5 times the volume of the subterranean gas storage cell.

In some embodiments, a fracking treatment can be performed to render the subterranean gas storage cell more porous prior to steps 72 and 74. A pressurized liquid (including water, containing sand or other proppants suspended with the aid of thickening agents) can be injected to create cracks in the subterranean gas storage cell. The cracks will allow fluids (liquid and gas) to flow more freely in the subterranean gas storage cell. In some embodiments, the fracking treatment can be performed in conjunction with step 72. For instance, the pressurized liquid may contain the saline water. In other words, the pressurized liquid may contain water and the ions as disucssed above for step 72.

In some embodiments, a heat treatment can be performed on the subterranean gas storage cell to remove excessive water as a result of injecting the saline water and the chelating solution, prior to step 76. The heat treatment can therefore unblock or unclog the subterranean gas storage cell. However, the heat treatment should not completely dry the subterranean gas storage cell. For example, the heat treatment can be terminated when there is no visible water droplet presence. The heat treatment can be terminated so that the subterranean gas storage cell contains 1-15 mass %, preferably 3-10 mass %, preferably 5-7 mass % of water based on the total mass of the subterranean gas storage cell.

In some embodiments, the subterranean gas storage cell may be purged with an inert gas/nitrogen/vacuumed, e.g., for 1 minute to 4 hours, preferably 10 minutes to 2 hours, preferably 30 minutes to 1 hour, to remove any trapped air prior to step 76. For example, an oxygen concentration due to the trapped air can be monitored. The purging or vacuuming can be terminated when the oxygen concentration the subterranean gas storage cell is below 50 mg/L, preferably below 25 mg/L, preferably below 10 mg/L, preferably below 5 mg/L.

At step 76, the process 70 includes injecting a gas mixture, including hydrogen gas, at a positive pressure into the subterranean gas storage cell. The gas mixture includes at least 50% hydrogen, preferably 55%, preferably 60%, preferably 65%, preferably 70%, preferably 75%, preferably 80%, preferably 85%, preferably at least 90% of the total weight of the gas mixture. The gas mixture is injected into the subterranean gas storage cell at a positive pressure in the range of 100-2000 pounds per square inch, preferably 500-1200, preferably 600-1100 psi, 700-1050 psi, preferably 800-1000 psi, preferably about 1000 psi.

At step 78, the process 70 includes storing a portion of the hydrogen gas in the pyrite under a storage condition. Under pre-defined conditions, as discussed above, at least a portion of the hydrogen gas, preferably about 300-600 mg, preferably 350-550 mg, preferably 450-550 mg, and preferably about 531 mg of hydrogen, is absorbed per gram of pyrite (the composition of pyrite described earlier). In some embodiments, the storage condition includes keeping the ions in the subterranean gas storage cell.

Figure 1C:
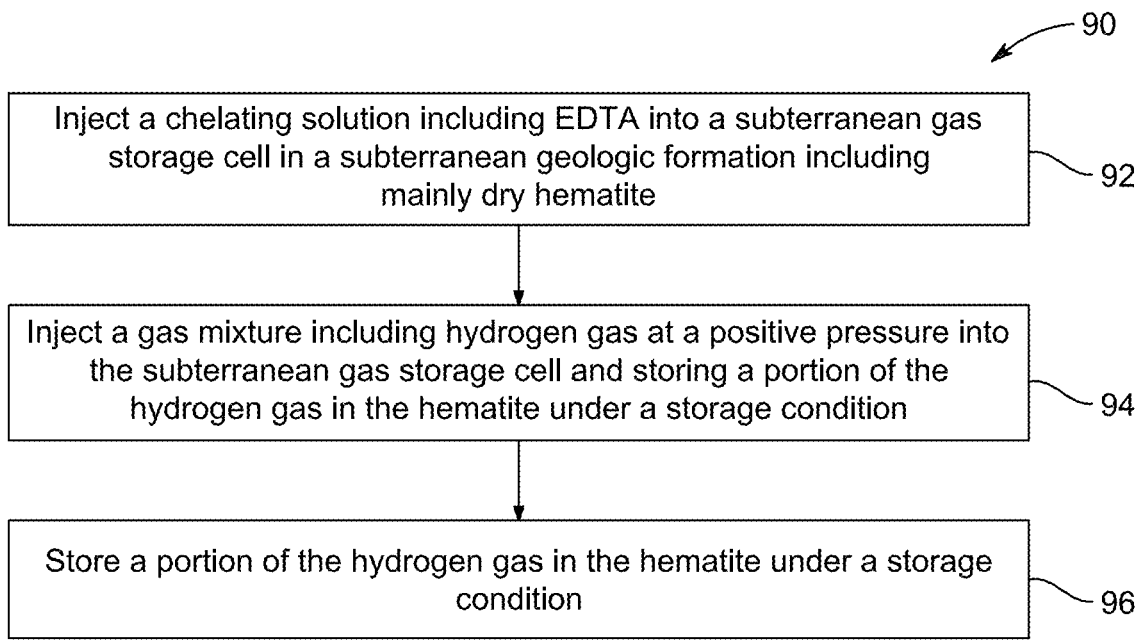
FIG. 1C is a schematic flowchart of a process of hydrogen storage, according to another embodiment.

FIG. 1C illustrates a schematic flow chart of a process 90 of hydrogen storage. The order in which the process 90 is described is not intended to be construed as a limitation, and any number of the described process steps can be combined in any order to implement the process 90. Additionally, individual steps may be removed or skipped from the process 90 without departing from the spirit and scope of the present disclosure.

At step 92, the process 90 includes injecting a chelating solution including EDTA into a subterranean gas storage cell in a subterranean geologic formation including mainly dry hematite. Optionally, other chelating agents, as mentioned earlier, can be used alone or in combination with EDTA. In some embodiments, the chelating solution includes 0.1 percent by mole (mol. %) to 2.0 mol. %, preferably 0.5-1.5 mol. %, preferably 0.7-1.2 mol. % of EDTA. Herein, the term "dry hematite" means no saline water is injected into the subterranean gas storage cell prior to injecting the chelating solution. In some embodiments, the volume of the chelating solution injected is 0.1-0.9 times, preferably 0.3-0.7 times, preferably 0.4-0.5 times the volume of the subterranean gas storage cell.

In some embodiments, a fracking treatment can be performed to render the subterranean gas storage cell more porous prior to step 92. A pressurized liquid (including water, containing sand or other proppants suspended with the aid of thickening agents) can be injected to create cracks in the subterranean gas storage cell. The cracks will allow fluids (liquid and gas) to flow more freely in the subterranean gas storage cell. In some embodiments, the fracking treatment can be performed in conjunction with step 92. For instance, the pressurized liquid may contain EDTA.

In some embodiments, a heat treatment can be performed on the subterranean gas storage cell to remove excessive water as a result of injecting the saline water and the chelating solution, prior to step 76. The heat treatment can therefore unblock or unclog the subterranean gas storage cell. However, the heat treatment should not completely dry the subterranean gas storage cell. For example, the heat treatment can be terminated when there is no visible water droplet presence. The heat treatment can be terminated so that the subterranean gas storage cell contains 1-15 mass %, preferably 3-10 mass %, preferably 5-7 mass % of water based on the total mass of the subterranean gas storage cell.

In some embodiments, the subterranean gas storage cell may be purged with an inert gas/nitrogen/vacuumed, e.g., for 1 minute to 4 hours, preferably 10 minutes to 2 hours, preferably 30 minutes to 1 hour, to remove any trapped air prior to step 94. For example, an oxygen concentration due to the trapped air can be monitored. The purging or vacuuming can be terminated when the oxygen concentration the subterranean gas storage cell is below 50 mg/L, preferably below 25 mg/L, preferably below 10 mg/L, preferably below 5 mg/L.

At step 94, the process 90 includes injecting a gas mixture including hydrogen gas at a positive pressure into the subterranean gas storage cell. The gas mixture includes at least 50% hydrogen, preferably 55%, preferably 60%, preferably 65%, preferably 70%, preferably 75%, preferably 80%, preferably 85%, preferably at least 90% of the total weight of the gas mixture. The gas mixture is injected into the subterranean gas storage cell at a positive pressure in the range of 100-2000 pounds per square inch, preferably 500-1200, preferably 600-1100 psi, 700-1050 psi, preferably 800-1000 psi, preferably about 1000 psi.

In some embodiments, the depth of the subterranean gas storage cell is determined prior to injecting the gas mixture such that the subterranean gas storage cell has an average temperature of 60-150° C., more preferably 70-90° C., and yet more preferably about 80° C. Typically, the gas storage cells are located at a depth of about 200 meters (m) to approximately 3000-3500 m, preferably 500-2000 m, preferably 1000-1500 m below the ground level, the depth of which may be dependent on several factors such as the nature of the rock, environment, mineralogy, etc. The depth is determined by methods conventionally known in the art. In a specific embodiment, the subterranean geologic formation includes 80-100 mass %, preferably 90-100 mass %, preferably about 100% of hematite, based on the total mass of the subterranean geologic formation. The subterranean geologic formation includes 80-100 mass %, preferably 90-100 mass %, and more preferably about 100% of $Fe_2O_3$, based on the total mass of the subterranean geologic formation.

At step 96, the process 90 includes storing a portion of the hydrogen gas in the hematite under a storage condition. Under pre-defined conditions, as discussed above, at least a portion of the hydrogen gas, preferably about 650-800 mg, preferably 675-760 mg, and more preferably about 754 mg of hydrogen, is absorbed per gram of hematite (the composition of hematite described earlier). In some embodiments, the storage condition includes keeping the ions in the subterranean gas storage cell.

EXAMPLES

The following examples demonstrate a method for storing and recovering hydrogen. They are provided solely for illustration and are not to be construed as limitations of the present disclosure, as many variations are possible without departing from the spirit and scope of the present disclosure.

Example 1: Materials

Pyrite, magnetite, and hematite samples used in the experiments pertaining to the present disclosure were purchased from Ward's Science, Rochester, NY. The makeup of samples was determined using an X-ray diffraction (XRD) system by Malvern Panalytical, with composition as shown in Table 1. Salts used in the present disclosure to prepare a brine solution, as depicted in Table 2, are of ACS reagent grade and include salts such as NaCl, $NaHCO_3$, $Na_2SO_4$, $MgCl_2$, and $CaCl_2$).

TABLE 1

| Sample composition from XRD analysis | | | | |
|---|---|---|---|---|
| | | Sample Composition (%) | | |
| Mineral | Chemical Formula | Pyrite | Magnetite | Hematite |
| Pyrite | $FeS_2$ | 82.3 | — | — |
| Magnetite | $Fe_3O_4$ | — | 69 | — |
| Hematite | $Fe_2O_3$ | — | — | 100 |
| Vermiculite | $(Mg, Fe^{2+}, Fe^{3+})_3[Al, Si_4O_{10}](OH)_2 \cdot 4H_2O$ | — | 2.8 | — |
| Quartz | $SiO_2$ | 17.7 | 28.3 | — |

Example 2: Methodology

The samples used in the present disclosure were ground into powder using a mortar and pestle to reduce the destruction of the crystals of the minerals. After the grinding process, the particle size distribution of the particles was determined. The samples have average particle size values of 7.03 micrometers (μm), 52.55 μm, and 27.72 μm for pyrite, magnetite, and hematite, respectively. The hydrogen indices (HI) of original samples (crushed, unexposed to hydrogen) were determined before exposure to hydrogen gas to serve as the basis for comparison using Rock-Eval analysis. To expose the samples to hydrogen gas, the samples were placed in a Teflon cup (5 g sample) and placed inside an aging cell. A cover of the aging cells was placed and fastened firmly. The aging cell is then vacuumed for 3 minutes to remove trapped air inside the aging cell. Subsequently, hydrogen gas is introduced into the cell at a set pressure. The pressure inside the cell is monitored via a pressure gauge installed upstream of the cell. Once the pressure reaches 1000 pascals per square inch (psi), the valve on the cell is locked. The assembly is then dismantled, and the cell is placed in an oven at a preset temperature of 80 degrees Celsius (° C.).

After 24 hours, the aging cell is removed from the oven, and the pressure left inside the aging cell is determined before opening the cell to release un-adsorbed hydrogen gas. The solid samples are thereafter retrieved, and HI is determined, as in the case of the original samples. For each mineral under study, two cases were investigated. The case of hydrogen adsorption on dry samples is referred to as a dry case, and the case of samples immersed in sea water (50 ml sea water with the composition shown in Table 2) is referred to as a wet case, hereinafter for brevity in explanation. The present disclosure considers real iron-bearing minerals. Further, the impact of brine on the hydrogen interaction with the iron-bearing mineral is also studied. The HI of both the dry and wet cases are determined and assessed in comparison to the original samples.

The effect of the adsorption capacity of the samples of hydrogen gas due to treatment with a chelating agent (Ethylenediaminetetraacetic acid (EDTA)) is evaluated. The experiment is repeated in both dry and wet conditions, with the corresponding HI determined for EDTA-treated samples. The HI is then used to assess the viability of hydrogen storage in the iron minerals.

TABLE 2

Seawater composition

| Ions | Concentration (ppm) |
| --- | --- |
| $Na^+$ | 18,300 |
| $Ca^{2+}$ | 650 |
| $Mg^{2+}$ | 2,110 |
| $SO_4^{2-}$ | 4,290 |
| $Cl^-$ | 32,200 |
| $HCO_3^-$ | 120 |
| TDS | 57,670 |

Example 3: Rock-Eval Analysis (Method of Hydrogen Adsorption Quantification)

The Rock-Eval 7 analyzer was utilized in the present disclosure for the evaluation of the total organic carbon, total sulfur content of rocks, and calculation of index like HI and oxygen index (OI). The aforementioned device has an alumina crucible, an oxidation temperature range of about 200° C. to 850° C., and pyrolysis temperatures of about 40° C. to 850° C., respectively. It also includes flame ionization detectors (FID) and infrared detectors (IR), which are used to detect $CO_2$ and hydrocarbons, respectively. The Rock-Eval 7 includes two furnaces, one for oxidation and the second for pyrolysis. In a combustion oven connected to the pyrolysis furnace, a portion of the effluents undergo pyrolysis, where the sulfur compounds are converted to $SO_2$. The FID and IR spectrometers are used to identify hydrocarbons and $CO/CO_2$, respectively, whereas the UV spectrometer is used to detect $SO_2$. After pyrolysis, the pyrolysis byproduct is oxidized in the oxidation furnace. The $SO_2$, CO, and $CO_2$ emissions are detected by UV and IR spectrometers, respectively. The adoption of a twin furnace design (pyrolysis and oxidation) is necessary to produce a long-lasting carbonaceous layer at the inner surface of the pyrolysis furnace. This coating prevents further adsorption and subsequent hydrocarbon loss that may affect hydrocarbon readings. The S1 and S2 peaks of the FID indicate that it is oxidized in single furnace machines. The superposition of the $SO_2$ and hydrocarbon signals allows us to distinguish between the organic sulfur, which is associated with the S1 and S2 peaks of the FID, and the pyritic sulfur. In accordance with the present disclosure, the quantities of pyritic sulfur and organic sulfur are estimated using a mathematical model based on parameters produced from the Rock-Eval 7 analysis. In addition, the kerogen technique of analysis was applied with a sample weight of 9 milligrams (mg) to 14 mg, determined with a precision of 0.02 mg.

Example 4: Scanning Electron Microscopy (SEM)

The change in the surface morphology of the samples under study due to exposure to hydrogen gas was investigated using a Gemini 550 scanning electron microscope (SEM). The SEM was fitted with an Aztec energy-dispersive X-ray spectrometer (EDX) and a backscattered electron (BSE) detector. To prepare the SEM samples, rectangular sample chips were cut and polished using smooth grit paper to get them ready for SEM imaging. The samples were subjected to hydrogen gas exposure in both wet (in the presence of brine) and dry (without brine) conditions, as well as with and without prior EDTA treatment. After the hydrogen gas exposure, the wet samples were dried at 40° C. for 24 hours before being used for imaging. The SEM samples were kept under identical circumstances to the previously mentioned powdered samples; as such, they were aged at the same temperature of 80° C. to mimic the same conditions. Following the aging time, the samples were allowed to dry, mounted on stubs, and coated with 30 nanometers (nm) palladium-gold using a Quorum QR150R sputter coater before being subjected to SEM examination. The voltage and current used for the SEM analysis ranged from 2 kilovolts (kV) to 15 kV and 100 picoampere (pA) to 2000 pA, respectively.

Example 5: Density Functional Theory (DFT) Calculations

In order to investigate hydrogen-iron mineral interactions that result, DFT calculations were performed. All DFT computations were carried out at a B3LYP/6-311g (d, p) level of theory. Using the self-consistent reaction field of the polarizable continuum model (PCM-SCRF), the calculations were performed implicitly in the solvent. To verify that the optimized structures are in a minimum energy state, frequency calculations were carried out. Further, the binding energies (counterpoise adjusted) from the intermolecular interaction of hydrogen and iron minerals were estimated along with additional attributes such as the frontier molecular orbitals and electrostatic potential maps. Furthermore, the Multiwfn program was used to analyze non-covalent interactions (NCI) and determine the type of interactions. Van der Waals interactions, steric clashes, and hydrogen bonds are a few interactions that may be observed and identified using NCI. This can be achieved by plotting the reduced gradient s (r) vs p (r) for low reduced gradient locations. Moreover, the NCI analysis may be applied to affirm bond formation, which is marked by a lack of peaks on reduced density gradient (RDG) maps.

Example 6: Adsorption

Figure 1D:
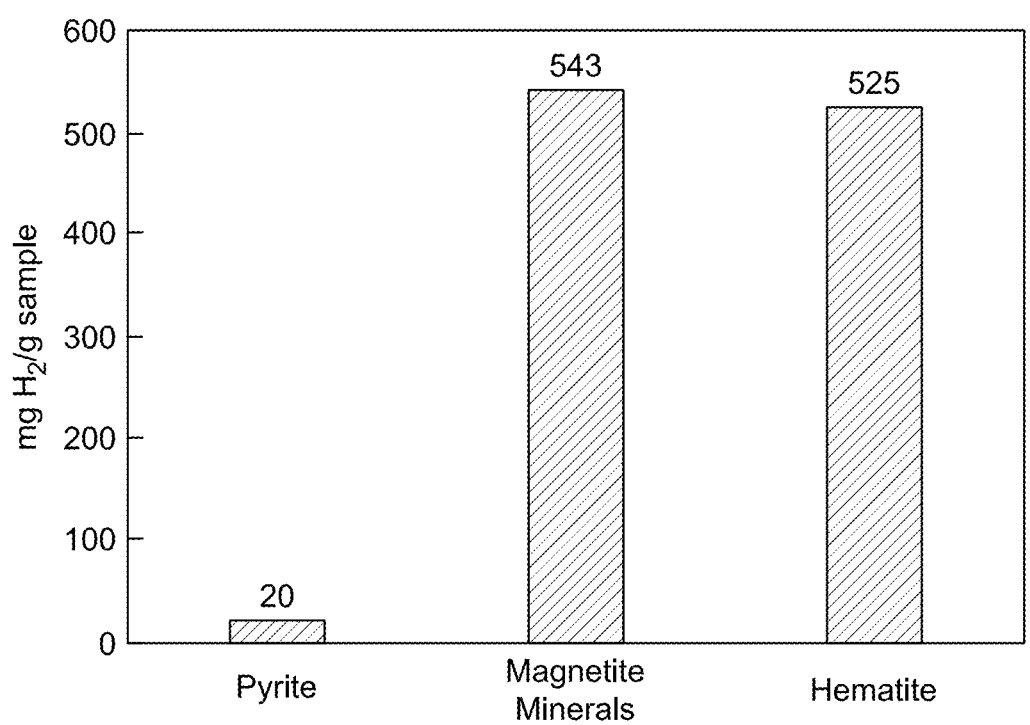
FIG. 1D shows hydrogen indices (HI) of intact samples, pyrite, magnetite, and hematite, according to certain embodiments.

The present disclosure describes that the iron-mineral-rich formations may be suited to store hydrogen gas and, in particular, the process that may be used to store and extract hydrogen from such storage media. The HI determined by the Rock-Eval analysis is utilized to provide insights into the feasibility of hydrogen storage and extraction in iron minerals. More precisely, HI is the total hydrogen content in milligram per gram of sample as determined by the S2 curve of the Rock-Eval analysis. FIG. 1D depicts the HI of intact samples (as received). According to the figure, magnetite has the highest HI, followed by hematite and pyrite, respectively. The samples are in their natural state, unaltered by treatment or hydrogen exposure. As such, in their natural form, iron oxides like magnetite and hematite absorb hydrogen onto their surfaces. Consequently, the HI of iron oxide is higher than the HI of pyrite. The oxidation of pyrite results in the transfer of electrons and formation of Fe (III) —OH⁻ species which may explain the HI found in the case of pyrite in its native state. The impact of exposing iron minerals to hydrogen gas and treating them with a chelating agent to determine improvement in the amount of adsorbed hydrogen gas is discussed in the subsequent sections.

Example 7: Magnetite

Figure 2:
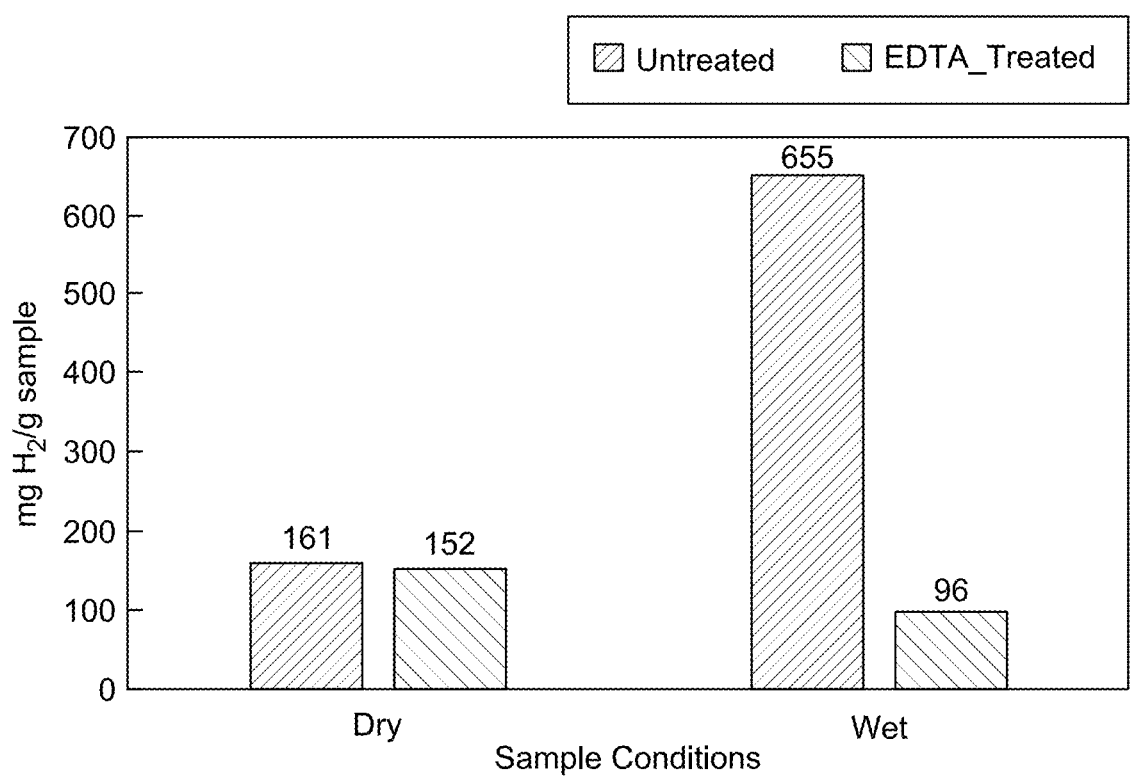
FIG. 2 shows HI of a magnetite sample treated and untreated with ethylenediamine tetraacetic acid (EDTA), in dry and wet conditions, according to certain embodiments.

Magnetite mineral interaction with hydrogen in the cases of dry and wet conditions, as well as with and without EDTA treatment, is depicted in FIG. 2. Magnetite in its native state has shown a strong HI index and implies that it may adsorb hydrogen gas, which is further supported by the results shown in FIG. 2. Further, before exposure to hydrogen in dry case conditions, magnetite displayed a high HI, however, upon interaction with hydrogen in the absence of water or brine, this number reduced significantly. Furthermore, with and without EDTA treatment, the HI remained roughly the same. The above results may imply that the injection of hydrogen gas into the magnetite rock results in it becoming less hydrogen-wet. Moreover, in wet experimental conditions where the magnetite particles are dispersed in brine before exposure to hydrogen, higher HI (higher than the native state) is observed. Compared to the native state and the dry conditions, there is an increase of around 20.6% and 306% in HI, respectively. This may translate to that some hydrogen either from the brine or the hydrogen gas, had adsorbed on the magnetite surface. Magnetite oxygen binding property may enable the formation of iron hydroxide aggregates. Thus, in a moist environment (in the presence of brine), it may be able to imbibe water to itself. The hydrogen generation and the conversion of magnetite to maghemite (equation 1) occurred at temperatures below 200° C. Consequently, the path indicated in Equation 2 allowed for the production of hydrogen. Experimental results demonstrated the transition, with water being identified as the oxidizing agent. Thus, aside from the ability of magnetite to produce hydrogen by its interaction with water, it may also adsorb hydrogen. However, the increase in the HI, as depicted in FIG. 2, is not due to the production of hydrogen from Equation 2 because the temperature of about 80° C. in the experiments is lower than the previously reported temperature of about 180° C. to 200° C., at which these interactions may occur. Thus, the increase in the HI, as shown in FIG. 2, is due to the adsorption of the hydrogen gas by the mineral. This demonstrates that magnetite may hold hydrogen on its surface for hydrogen storage purposes. Further, the ability to retrieve the stored hydrogen when needed is vital. FIG. 2 shows that upon the treatment of the magnetite sample with EDTA solution, the HI is reduced by 85%. Thus, the magnetite mineral system may be used for storing hydrogen by injecting brine before hydrogen gas injection. Then, to release the stored gas from the rock surface, an EDTA solution or chelating agent solution can be injected. Thus, a protocol for the storage of hydrogen gas and its retrieval is proposed.

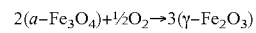

$$2(a\text{-}Fe_3O_4) + \tfrac{1}{2}O_2 \rightarrow 3(\gamma\text{-}Fe_2O_3)$$

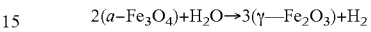

$$2(a\text{-}Fe_3O_4) + H_2O \rightarrow 3(\gamma\text{--}Fe_2O_3) + H_2$$

Example 8: Hematite

Figure 3:
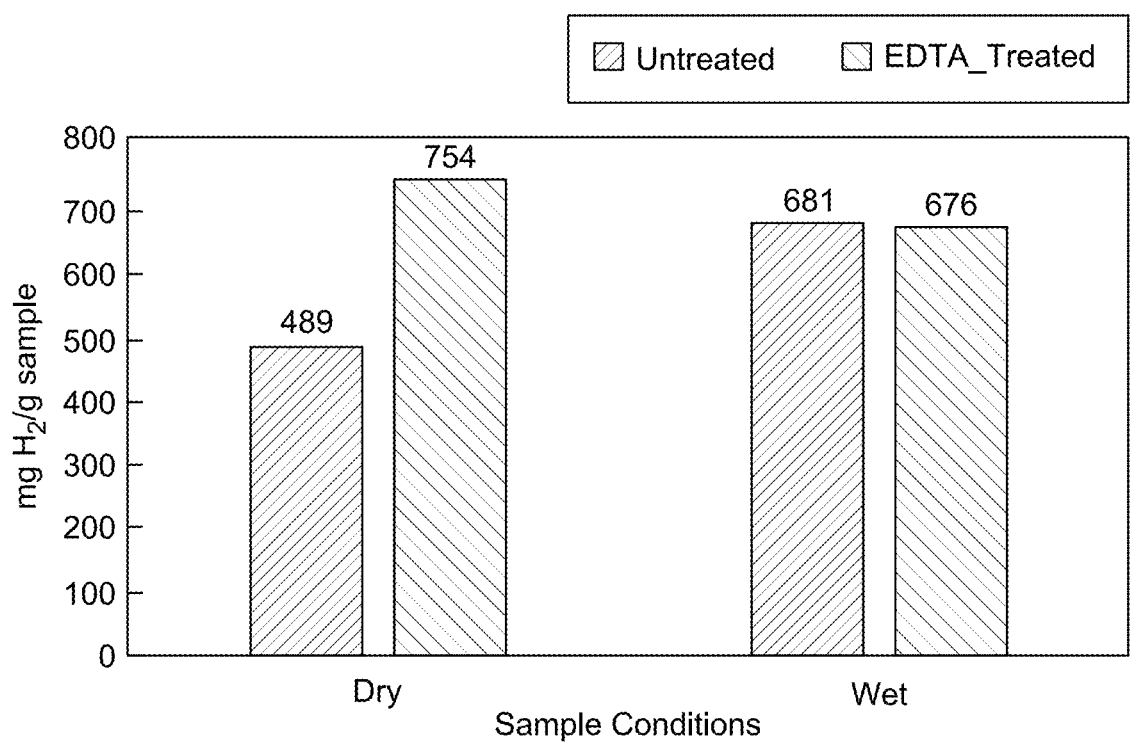
FIG. 3 depicts HI of a hematite sample treated and untreated with EDTA, in dry and wet conditions, according to certain embodiments.

Hematite is an iron oxide mineral different from magnetite, for instance with a different oxidation state of the iron element. The native state of hematite mineral has a high HI value almost comparable to that of magnetite. However, the behavior of hematite differs significantly from that of magnetite when exposed to hydrogen gas. Unlike the case of magnetite, where a significant decrease in the HI was recorded in the dry instances, a less drastic reduction is observed in the case of the untreated sample with an HI of 489 compared to the native state with 525, as shown in FIG. 3. In the case of hematite, treatment with EDTA in dry instance showed an increase in HI, higher than those of magnetite in wet conditions. This implies that in a dry environment, such as reservoirs with no brine or oil in places, injection of EDTA into the formation before hydrogen gas injection may serve as a great storage medium. In the wet conditions, no significant difference between the EDTA-treated hematite and untreated is observed. Thus, in both instances of wet conditions, higher HI than the native state is recorded. Thus, hydrogen adsorption on hematite occurs in dry cases upon EDTA treatment and in all wet instances.

Example 9: Pyrite

Figure 4:
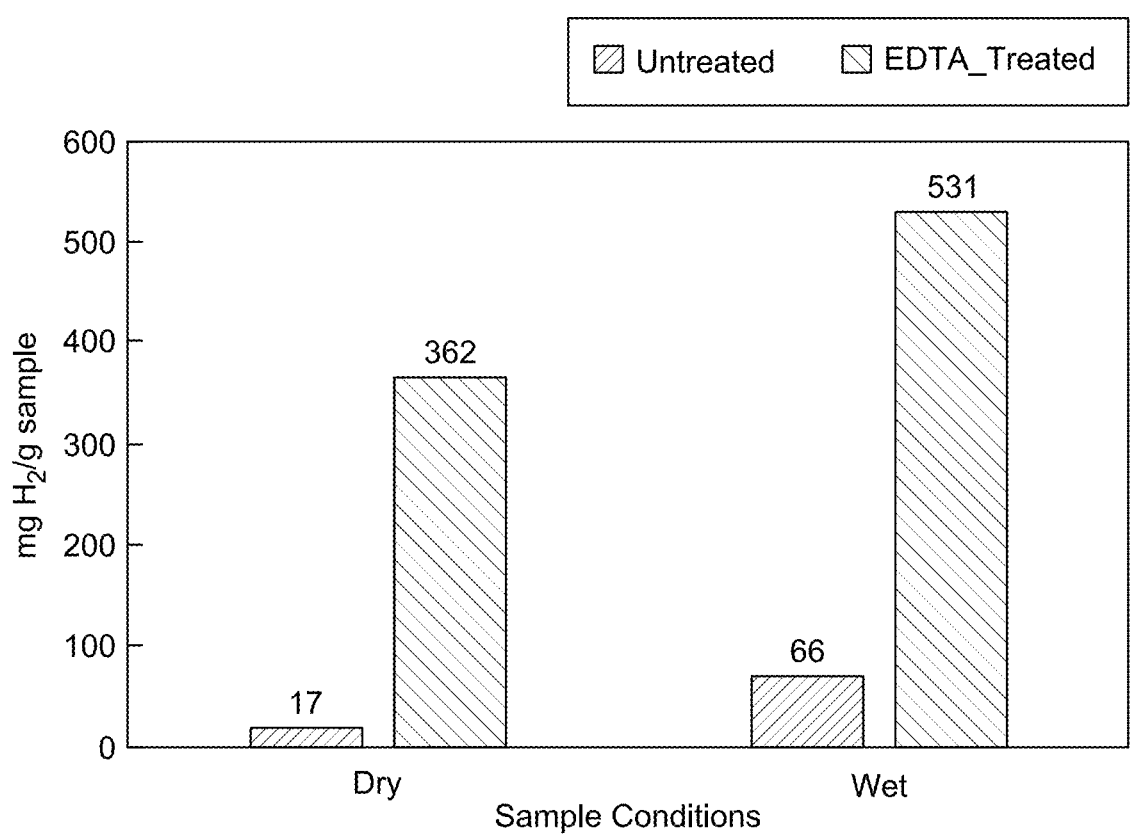
FIG. 4 depicts HI of a pyrite sample treated and untreated with EDTA, in dry and wet conditions, according to certain embodiments.

Pyrite mineral interaction with hydrogen in both cases of wet and dry conditions, as well as with and without EDTA treatment, is discussed herein. The results of the HI evaluation are shown in FIG. 4. Compared to the native pyrite sample HI, which was recorded to be a 20 mg/g sample in FIG. 1D, the values shown in FIG. 4 are different. In the dry sample condition, the untreated sample interaction with hydrogen resulted in a 15% (3 mg/g-sample) reduction in the HI of pyrite, as compared to the native state. This may be due to the formation of hydrogen sulfide. In the same dry conditions, sample treatment with EDTA before exposure to $H_2$ increases the HI of the pyrite mineral. This implies that pyrite sample treatment with EDTA improves its hydrogen adsorption capacity. Comparing this value with the native pyrite and the untreated sample both at dry conditions, EDTA treatment increases the HI of both samples by 18 and 21 folds, respectively. This implies that hydrogen storage in iron-banded formations rich in pyrite may be achieved by treating the formation with EDTA before $H_2$ injection for storage. Dry conditions are not the case in oil and gas reservoirs which have been stated to be an option for storage site selection. Furthermore, depleted reservoirs are suitable for injecting gases since the infrastructure required to inject gases into the reservoirs is already in place. Also present in the reservoirs are brines, which were the first occupants of the pore spaces before the drainage process, which replaces the water with either oil or gas. Moreover, reservoirs where waterflooding has taken place have a significant amount of brine in place; thus, the impact of the presence of brine on the adsorption of hydrogen on the pyrite mineral is investigated. The presence of brine is observed to increase the HI of the pyrite sample in both cases of untreated and treated samples. Thus, this is a significant advantage as most reservoirs have brine presence. In the case of the untreated sample, the recorded HI is 66 mg/g-sample compared to 17 mg/g-sample and 20 mg/g-sample, in the cases of dry and native samples, respectively.

Figure 5:
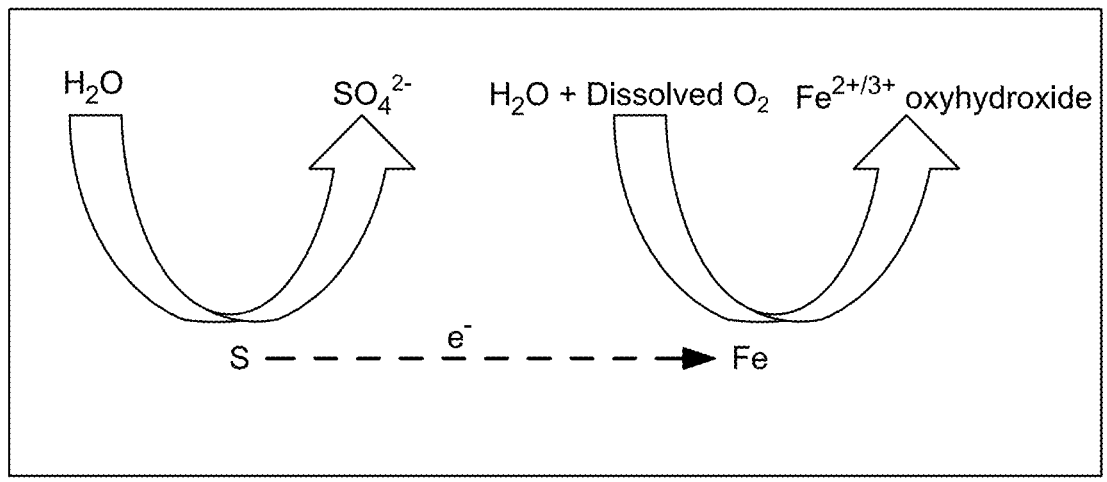
FIG. 5 is a schematic diagram depicting pyrite-water interaction.

The interaction of pyrite mineral in brine with $H_2$ may result in the formation of sulfate and iron oxyhydroxide, as shown in FIG. 5. This may be the case as the formation of sulfate reduces the pH of the brine. The pH measurement after the reaction time showed that the pH had reduced from an initial value of 8.35 to 4.09, thus, confirming reaction route inference. As such, the oxygen-bearing component in the system may interact with hydrogen via hydrogen bond formation, providing an increase in HI in the cases of wet conditions. In addition, the treatment of the sample with EDTA increased the HI twice, in comparison to the dry case, which had an HI of 362 mg/g-sample. From the HI evaluation conducted in the case of pyrite, hydrogen storage in a pyrite-rich system may be feasible due to the ability of the pyrite mineral to hold hydrogen to its surface. This is the case in both dry systems where brine or water does not exist in the formation and in the cases where brine exists; however, the storage capability is only assured after the pyrite rock has been treated with a chelating agent.

Example 10: Iron Mineral Structural Integrity Assessment

Effects on the structural integrity factors, including permeability and hardness by the interaction of hydrogen with iron minerals, are described. Structural integrity is required for the iron-banded formation which is regarded to have the potential for storing hydrogen gas in terms of a viable storage option. Further, it is important that oil and gas reservoirs, particularly the depleted ones designated as possible storage locations can tolerate these kinds of interactions. The pyrite and magnetite samples are among those examined in this section. As mentioned above, these samples are aged and exposed to hydrogen gas at a pressure of about 1000 psi in both dry and wet conditions. The hardness and permeability of the iron minerals were evaluated following a 24-hour exposure to hydrogen in order to evaluate the structural integrity of the minerals. Furthermore, the degree of variation in the permeability and hardness, before and after treatment, is examined by reporting the changes in percentages. The untreated samples received the same temperature and duration of treatment as the samples that were exposed to hydrogen.

Example 11: Sample Hardness

Figure 6A:
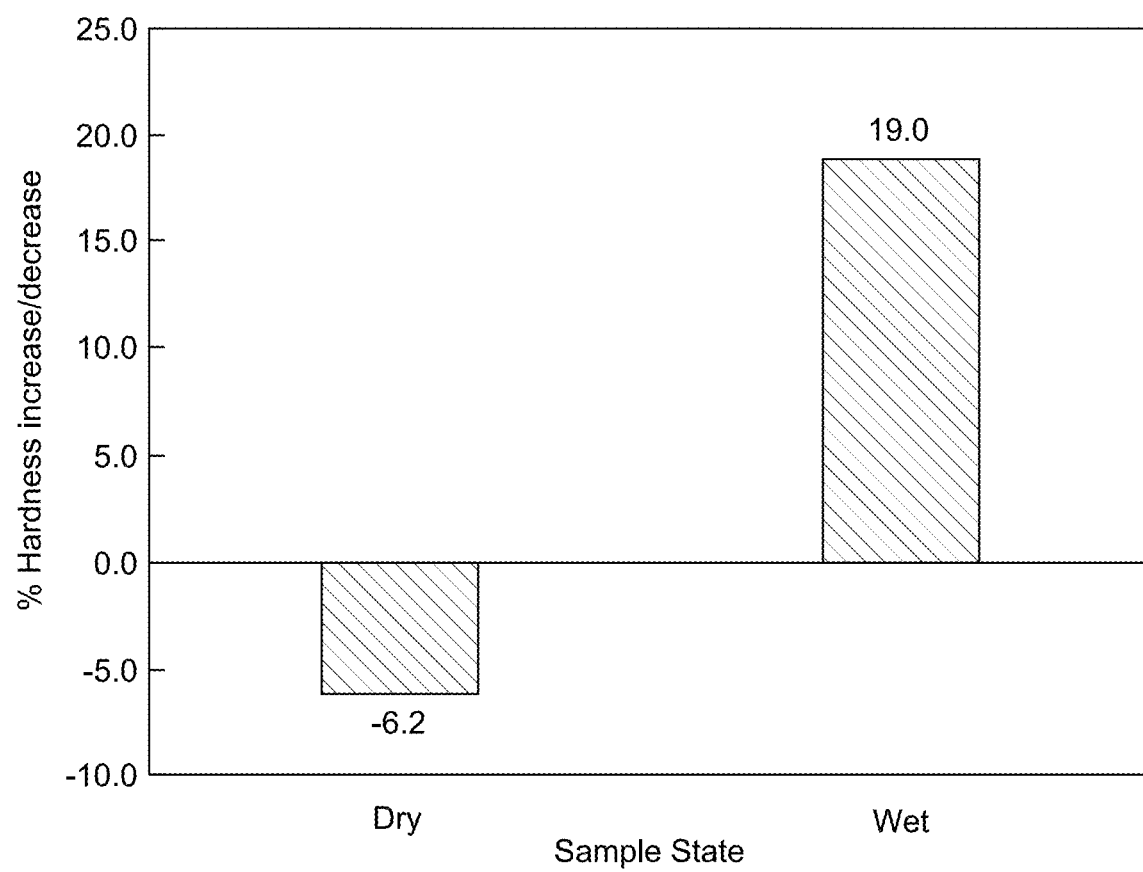
FIG. 6A shows sample hardness for pyrite, according to certain embodiments.
Figure 6B:
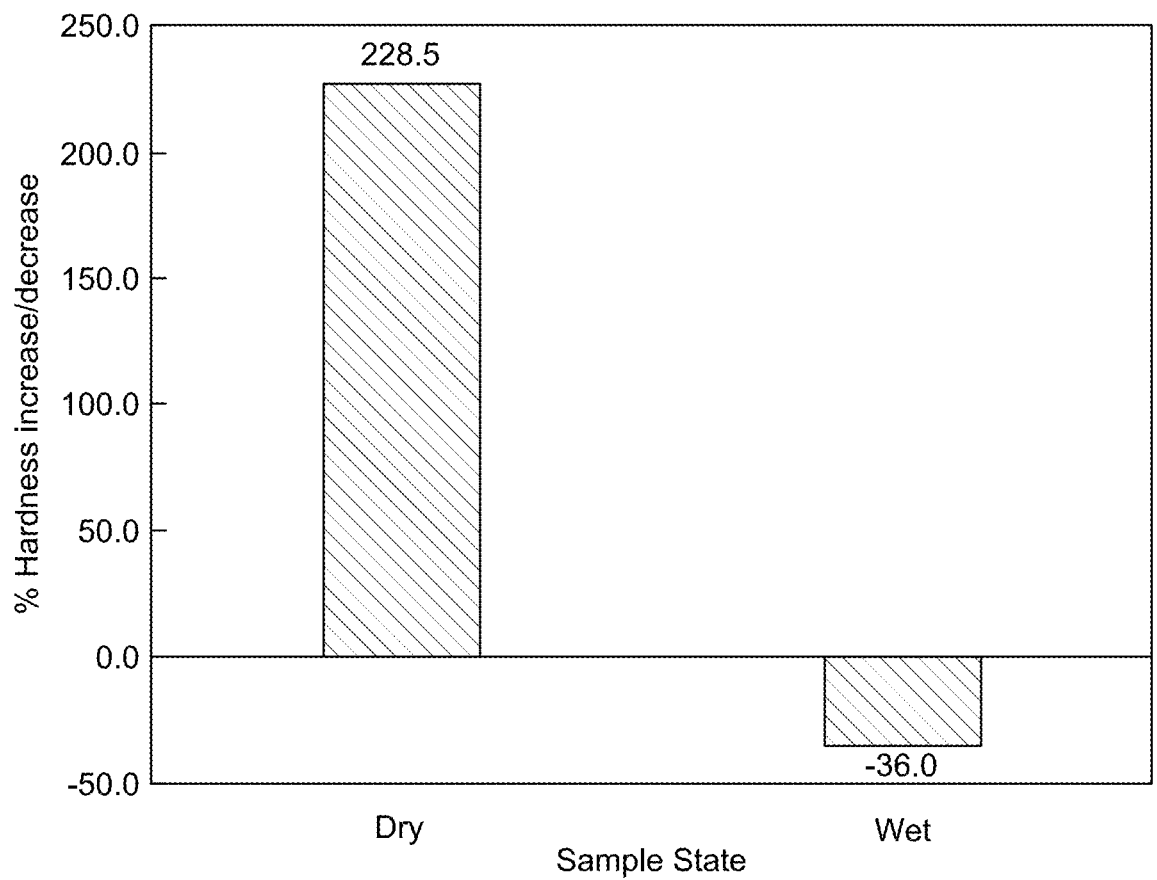
FIG. 6B shows sample hardness for magnetite, according to certain embodiments.

The hardness of the pyrite sample and magnetite samples is shown in FIGS. 6A-6B. In the case of pyrite, as shown in FIG. 6A, the hardness is observed to decrease by 6.2% in the dry state as compared to the observed increase of 19% in hardness in the wet case. This implies that in the dry condition, hydrogen interaction with the pyrite samples reduces its hardness. However, in the presence of brine, the reverse is observed, leading to an increase of about 19% in hardness. The HI of the treated samples in the case of pyrite is depicted in FIG. 1D and FIG. 4. As can be seen from FIG. 4, the interaction of hydrogen with pyrite in dry conditions showed a reduction in the HI from a value of 20 to 17. Further, in the wet conditions, an increase in the HI index value to a value of 66 is observed. This shows a direct correlation with the observed hardness, as depicted in FIG. 6A. Thus, from HI and the measured hardness of the pyrite sample, it may be noted that a direct correlation exists. Thus, an increase in the adsorption of hydrogen on the pyrite surface results in sample hardness, whereas a decrease in adsorption reduces the sample hardness. This has significant implications in that the storage of iron in iron-rich reservoirs in the presence of brine may improve the structural integrity of the formations.

In the case of the magnetite sample, as depicted in FIG. 6B, the observation is opposite that of pyrite, as depicted in FIG. 6A. For magnetite in dry conditions, an increase in the sample hardness of about 228.5 is recorded, whereas in the presence of brine, a decrease of 36% is observed. For example, mining sites, due to the brittle and ductile nature of the banded iron formations (BIF), collapses in the mining site are a big concern for the safety of the miners. Thus, from the aforementioned results, it may be implied that injecting iron into the BIF rich with iron oxides such as magnetite may improve its hardness. In wet conditions, a relatively lower increase in hardness is observed. A correlation with the HI of the magnetite sample may be established. In the case of magnetite, an increase in the HI correlates to a decrease in the sample hardness, as can be inferred from FIG. 2 and FIG. 6B.

Example 12: Sample Permeability

Figure 7A:
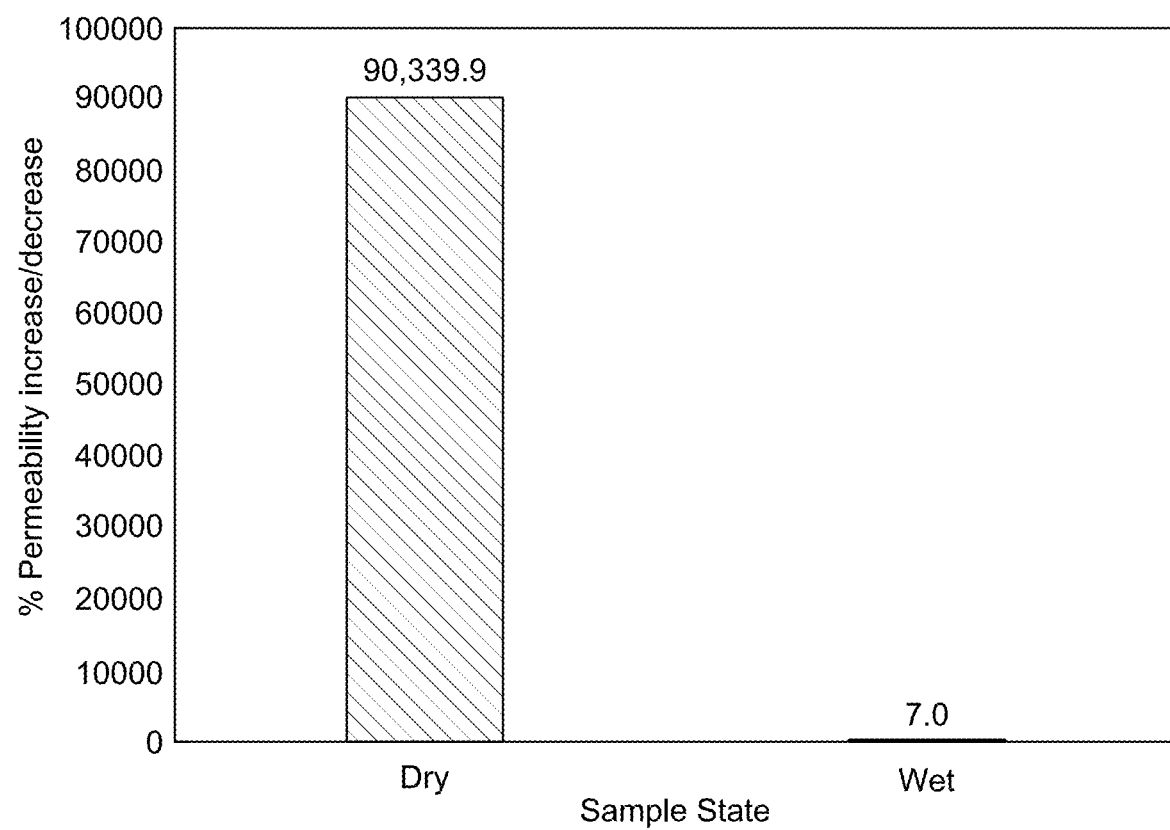
FIG. 7A shows sample permeability for pyrite, according to certain embodiments.
Figure 7B:
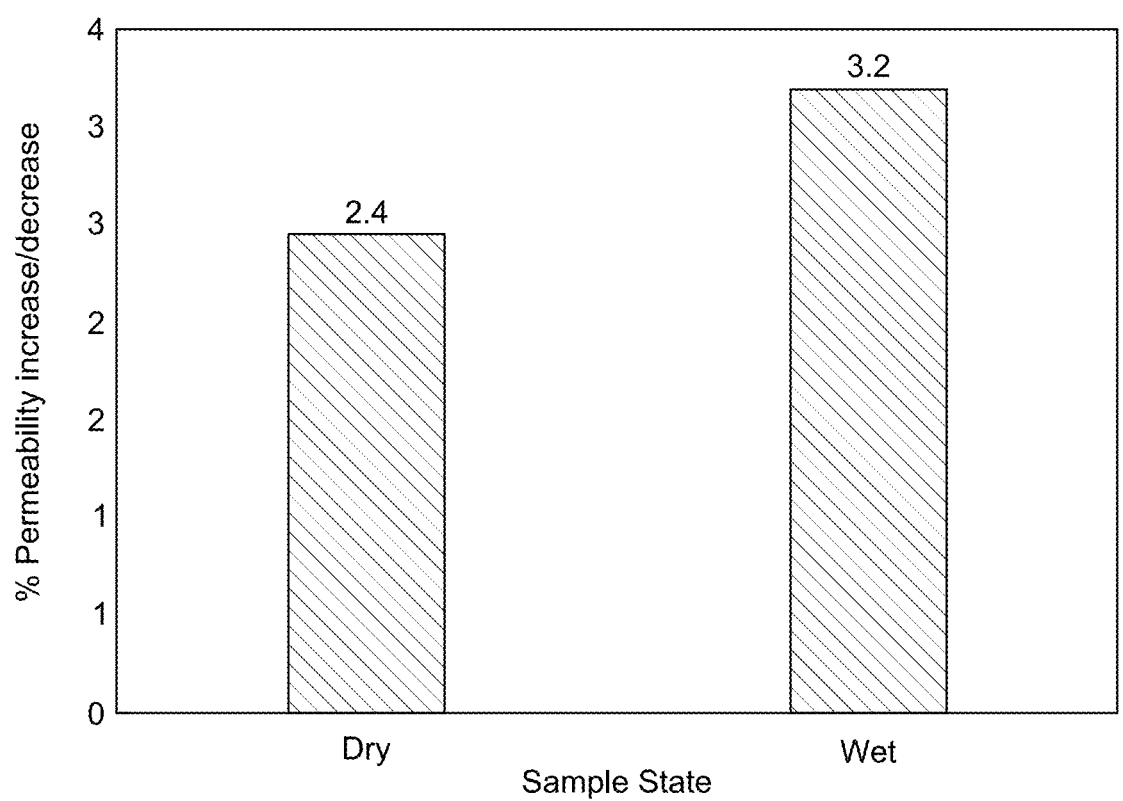
FIG. 7B shows sample permeability for magnetite, according to certain embodiments.

Just as the sample hardness was analyzed, sample permeability was also measured. The results of permeability measurements of the treated samples compared to the untreated samples are depicted in FIGS. 7A-7B. In the case of pyrite, as shown in FIG. 7A, regardless of the sample state, permeability improvement was recorded. However, an improvement in permeability was observed in the case of dry conditions. Thus, treating the pyrite sample with hydrogen increases the sample permeability by over 90000%. Further, it has a significant implication for different field applications. For example, for oil and gas wells where the pyrite scale is a major flow assurance concern, injection of hydrogen may make the pyrite scale more porous than the reservoir itself, resulting in restoration of the impaired permeability. Furthermore, this may create a flow path to allow the easy flow of chelating agents, which are used to remove scale. Moreover, it may reduce the required concentration and volume of chelating agent required to remediate pyrite scale concerns. In the case of magnetite, as shown in FIG. 7B, a relatively lower increase in permeability, 2.4%, and 3.2%, is observed in the dry and wet conditions, respectively. Thus, as pyrite, regardless of the sample state, the treatment of iron minerals with $H_2$ results in a permeability increase.

Example 13: Density Functional Theory (DFT) Calculations

Figure 8A:
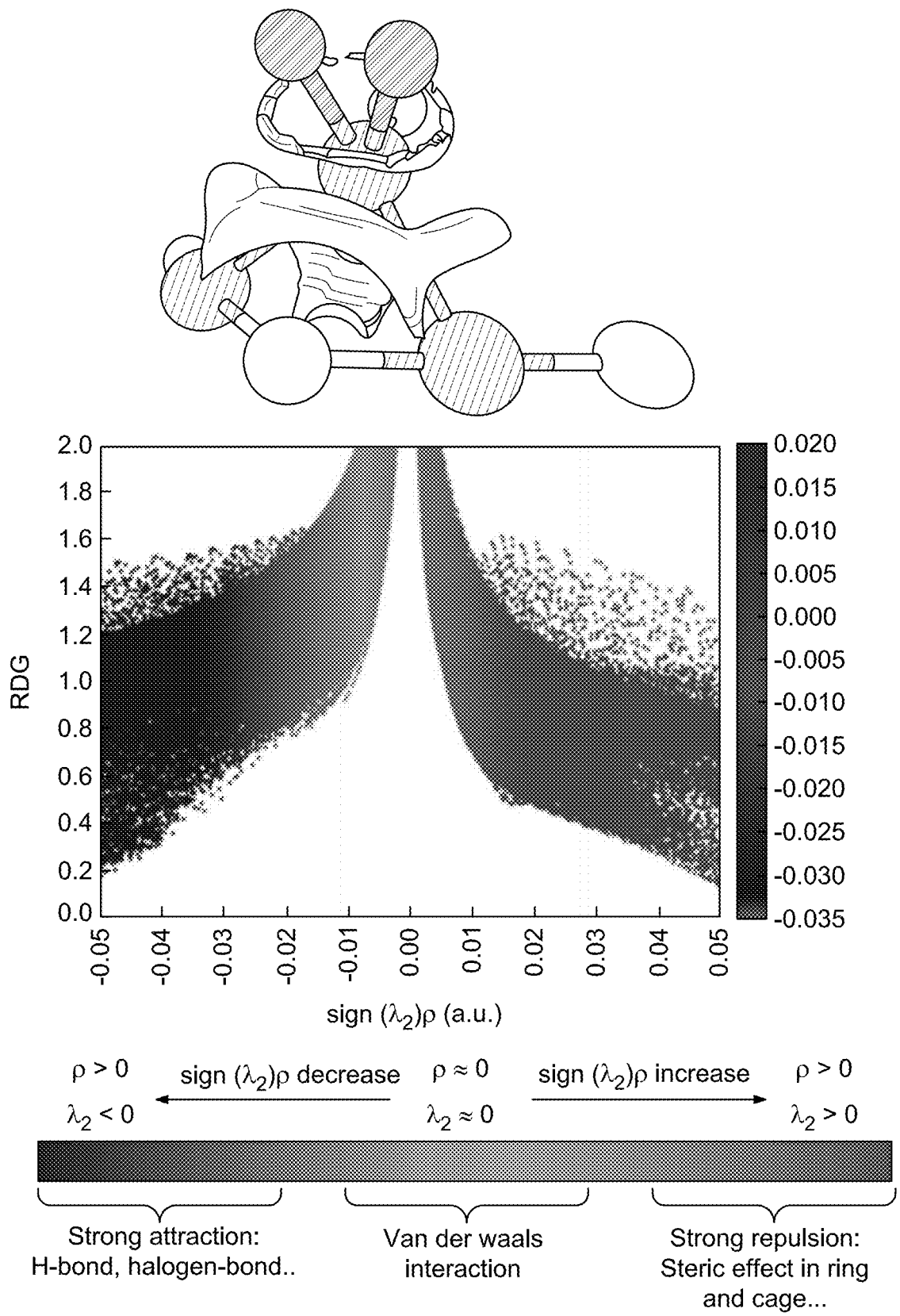
FIG. 8A shows non-covalent interactions (NCI) and reduced density gradient scatter plots for interactions of magnetite with hydrogen, according to certain embodiments.
Figure 8B:
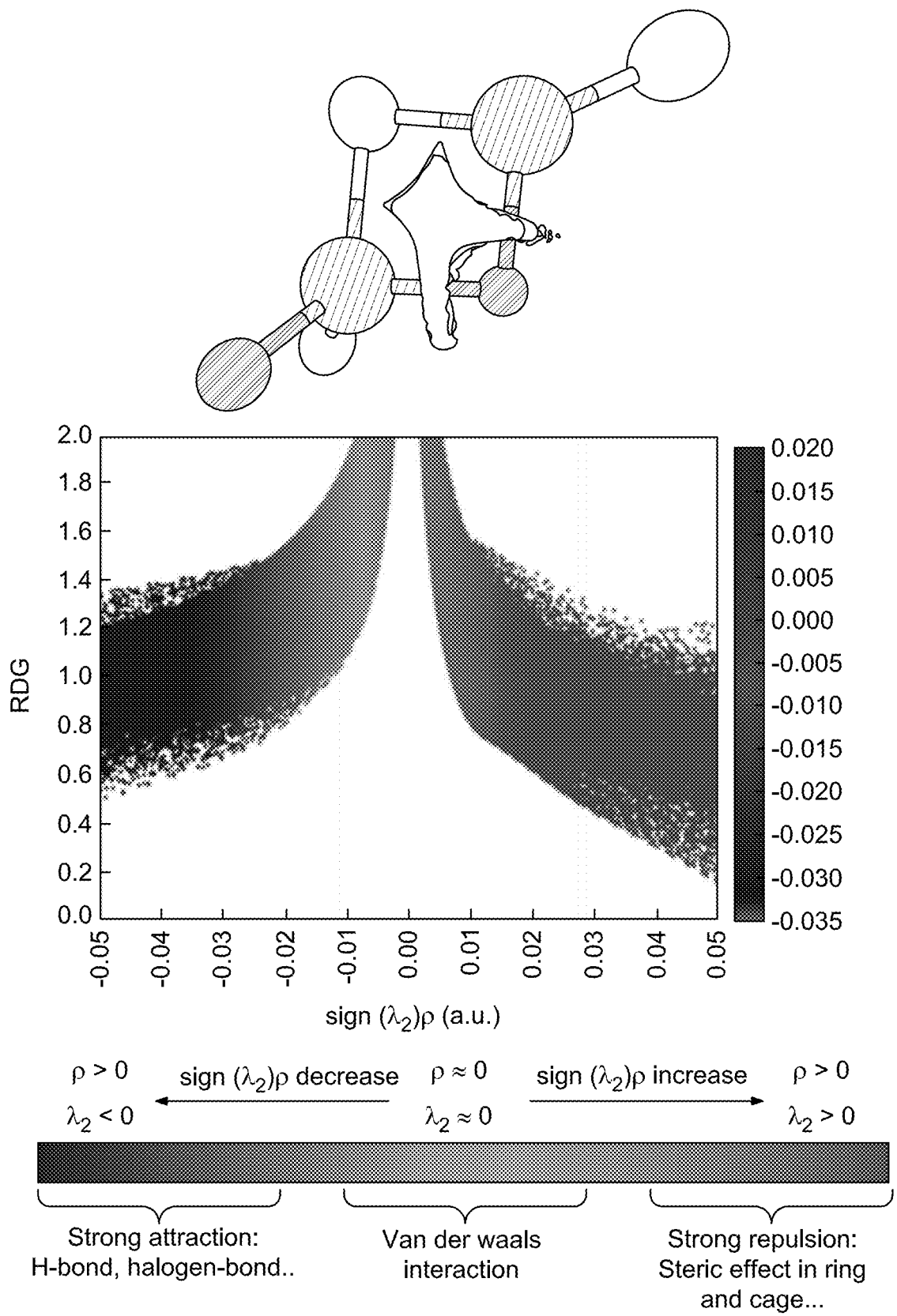
FIG. 8B shows NCI and RDG scatter plots for interactions of hematite with hydrogen, according to certain embodiments.
Figure 8C:
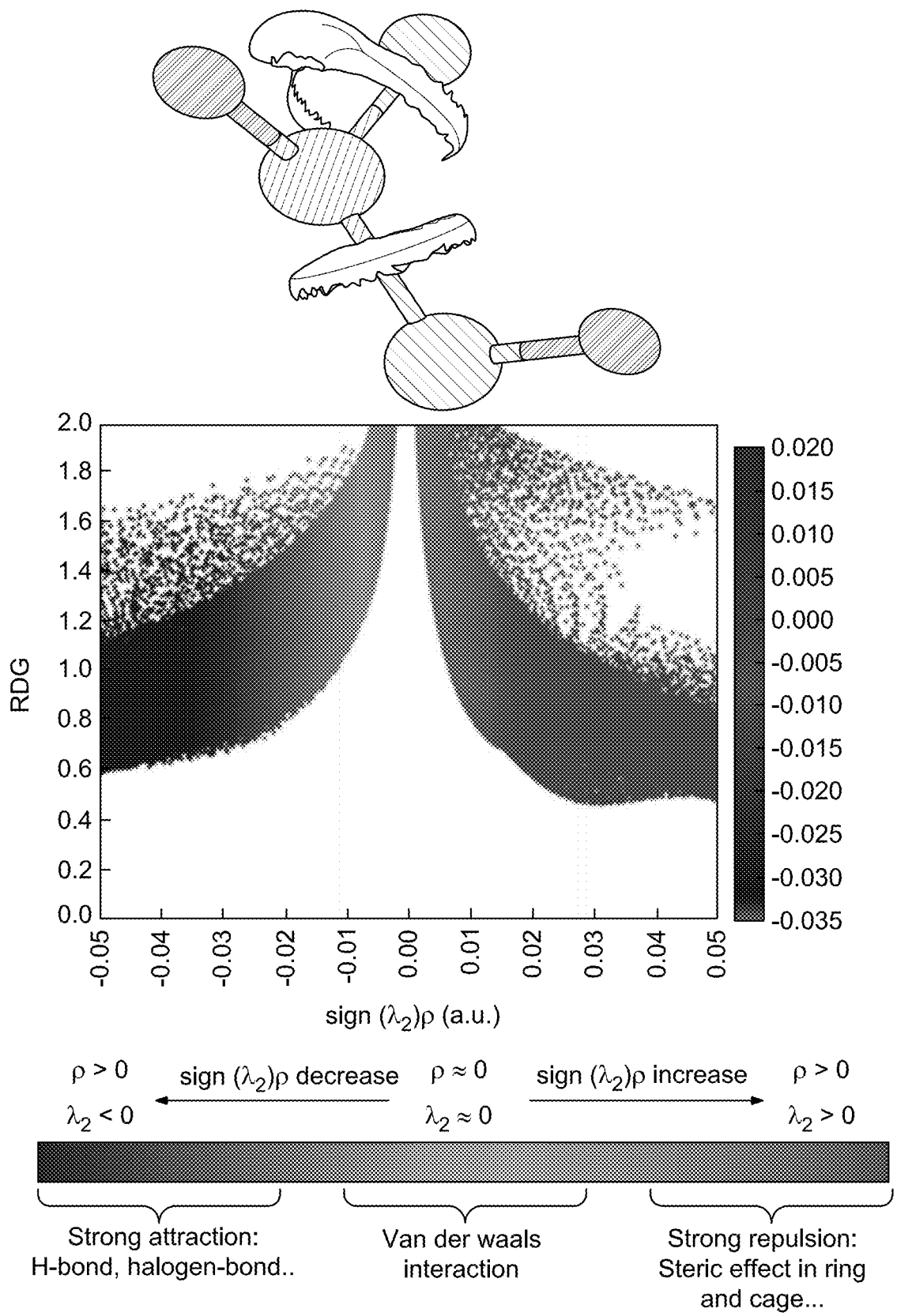
FIG. 8C shows NCI and RDG scatter plots for interactions of pyrite with hydrogen, according to certain embodiments.

The DFT calculations provided in the present disclosure utilized a simple molecular representation of each mineral to interact with a single molecule of hydrogen to establish the degree of interaction and the nature of the interaction. Table 3 and FIGS. 8A-8C shows the binding energy of the interaction of the mineral with hydrogen, and the NCI analysis results show the type of interactions. As such, negative values imply that the interaction is thermodynamically favored, whereas positive values mean that the interaction may not be favored thermodynamically. Further, a positive binding energy implies that the interaction requires energy for such interaction to take place. In some embodiments, hematite has the most thermodynamically favored interaction with hydrogen, followed by pyrite and magnetite. However, if external energy is provided, then magnetite may dominate interactions with hydrogen-given that, the calculations were performed in the absence of water. Correlation is observed between the percentage reduction of HI between the dry state (without treatment) compared to the native state and the binding energy. It can be observed that hematite-hydrogen, which has the highest binding energy, has the lowest percentage reduction of HI of about 6.86% compared to its HI in its native state and dry state. This is followed by pyrite, which has a percentage reduction of 15%, and lastly, the least is the case of magnetite, with a 70.35% reduction in HI. Thus, it may be inferred that the binding affinity of hydrogen to this mineral is in direct correlation to the reduction in their HI upon exposure to hydrogen in dry cases. More so, NCI analysis showed that the hydrogen is covalently bonded to all the minerals. This is further validated by the RDG map which showed no peak characteristics of interaction had no bond been formed. Thus, in the DFT calculations, hydrogen atoms can strongly be adsorbed on the surfaces of the mineral by bond formation, and the retrieval of the bonded hydrogen has to be by chemical methods.

TABLE 3

Mineral-$H_2$ interaction energies

| Pairs | Binding Energy (kcal/mol) |
| --- | --- |
| Pyrite-$H_2$ | −5.74 |
| Magnetite-$H_2$ | 20.98 |
| Hematite-$H_2$ | −11.69 |

Example 14: SEM Image Analysis

Figure 9A:
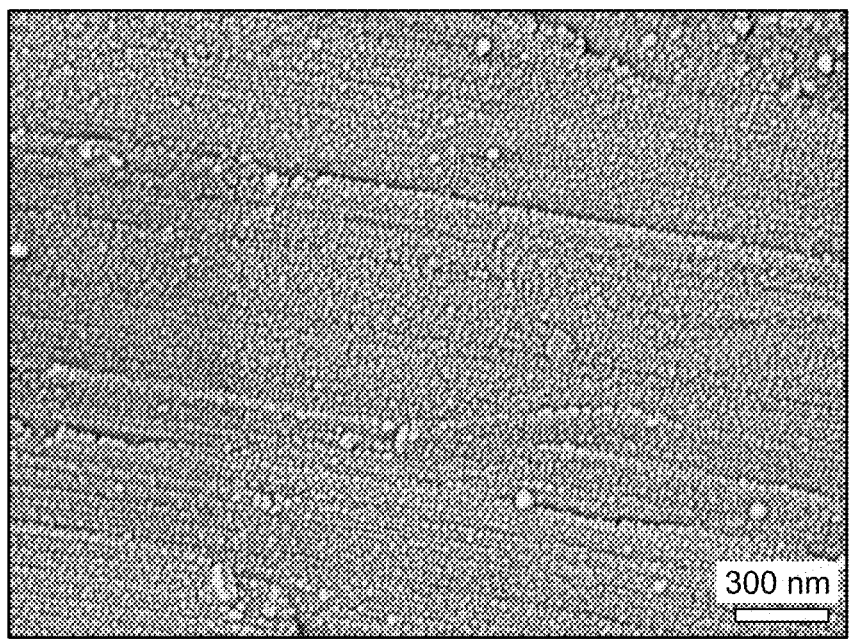
FIG. 9A is a scanning electron microscopy (SEM) image of the intact magnetite, according to certain embodiments.
Figure 9B:
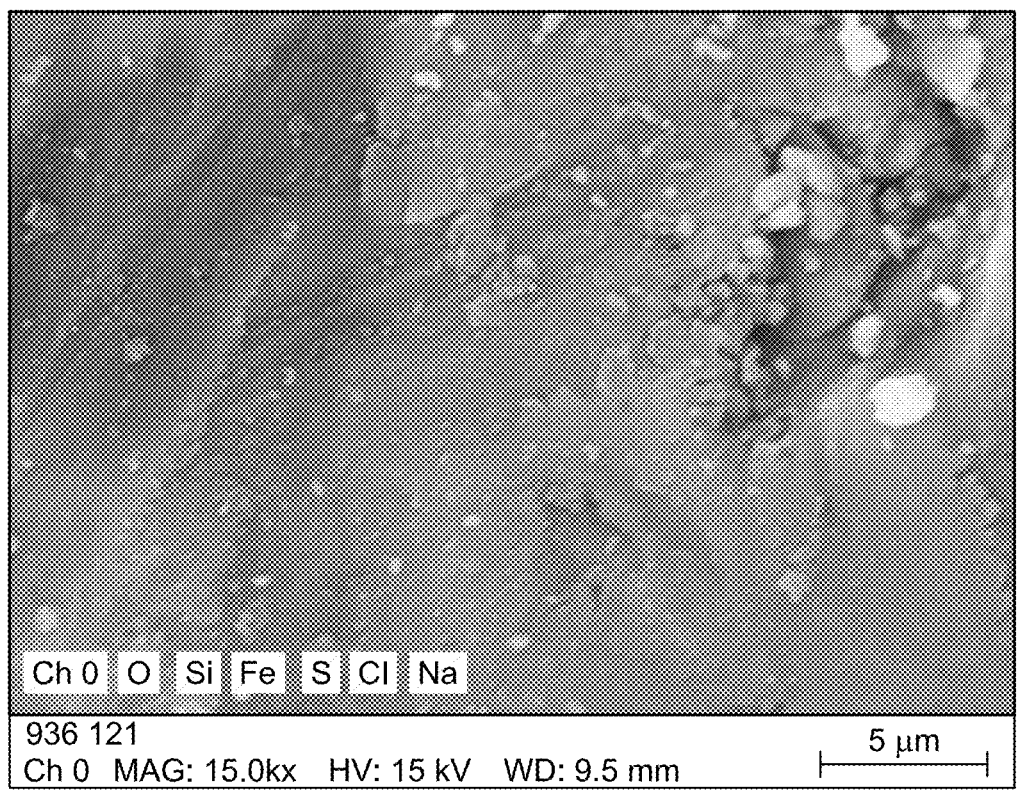
FIG. 9B shows energy dispersive X-ray (EDX) analysis for intact magnetite, according to certain embodiments.

In order to examine the change in the surface properties of the samples exposed to hydrogen gas in both dry and wet conditions, as well as evaluate the effect of EDTA treatment on the sample surface, an SEM analysis is presented herein. The pyrite and magnetite samples were examined due to the availability of solid samples of the minerals. Observations discussed herein, in the case of magnetite, may apply to hematite as well. The SEM image of the unexposed magnetite in its natural form, as received from the supplier, is shown in FIGS. 9A-9B. Further, FIG. 9A shows the surface is dominated by dot-like spots, which may be hydrogen bonding sites. Furthermore, the EDX analysis, as shown in FIG. 9B showed that the samples are made of iron, oxygen, and silicon, which agrees with the XRD data presented in Table 1. Furthermore, as can be seen from FIG. 9A, the spots are high in number and cover the whole sample; thus, this may explain the high HI as observed in the native samples of both magnetite and hematite samples.

Figure 10A:
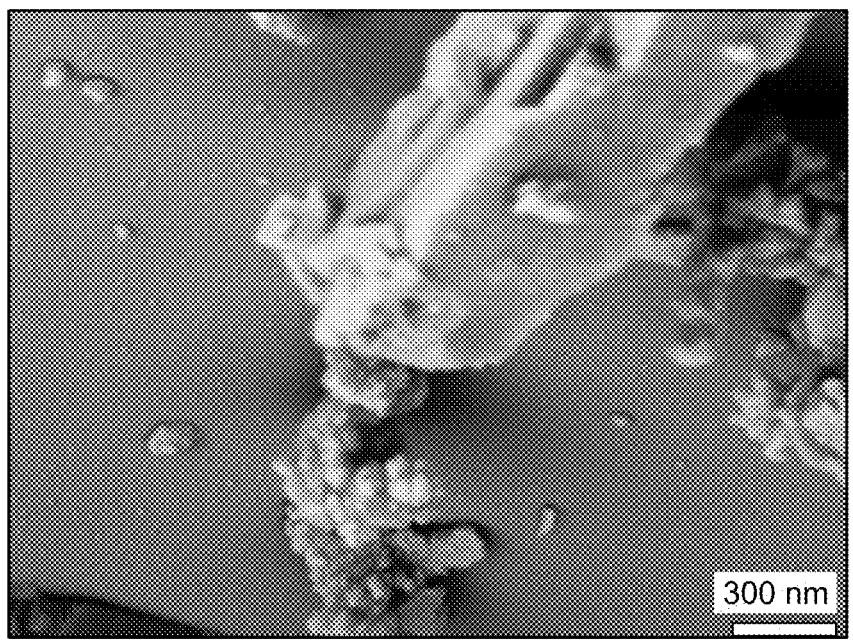
FIG. 10A is an SEM image magnetite in dry conditions without EDTA treatment, prior to exposure to hydrogen gas, according to certain embodiments.
Figure 10B:
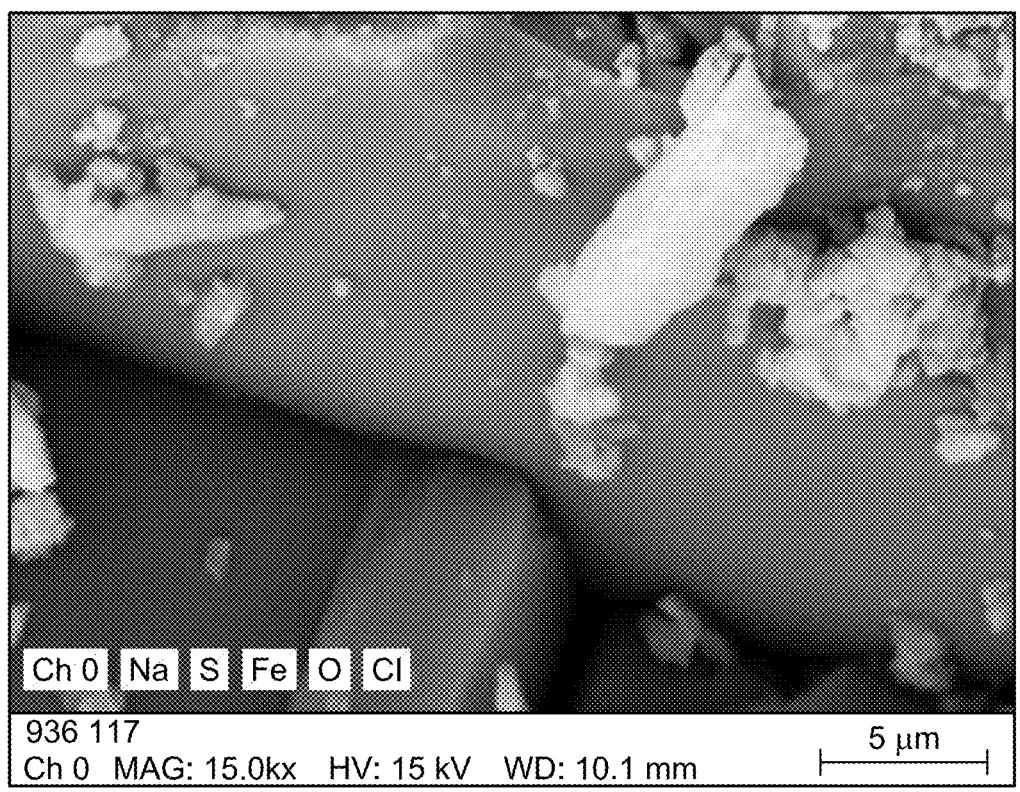
FIG. 10B shows EDX analysis of magnetite in dry conditions without EDTA treatment, prior to exposure to hydrogen gas, according to certain embodiments.
Figure 10C:
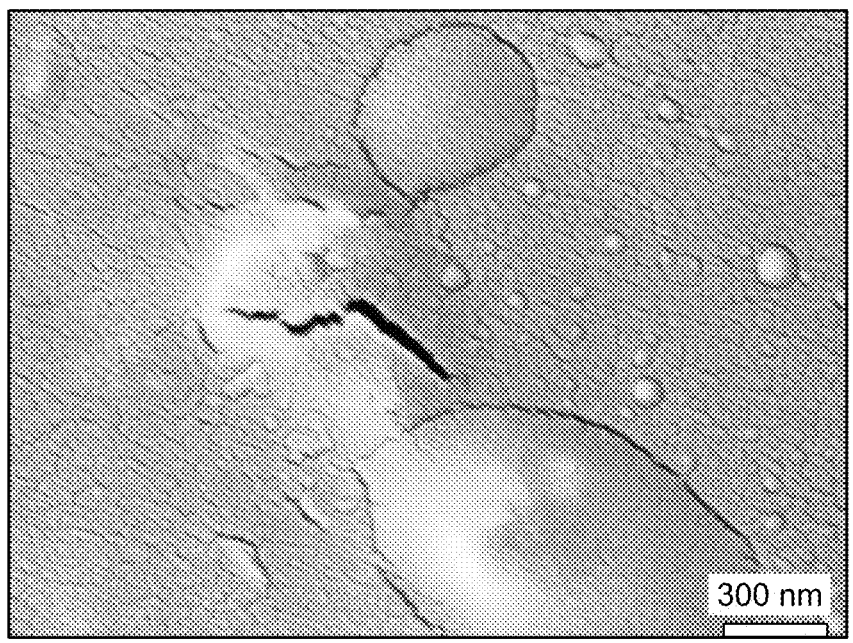
FIG. 10C is an SEM image magnetite in dry conditions with EDTA treatment, prior to exposure to hydrogen gas, according to certain embodiments.
Figure 10D:
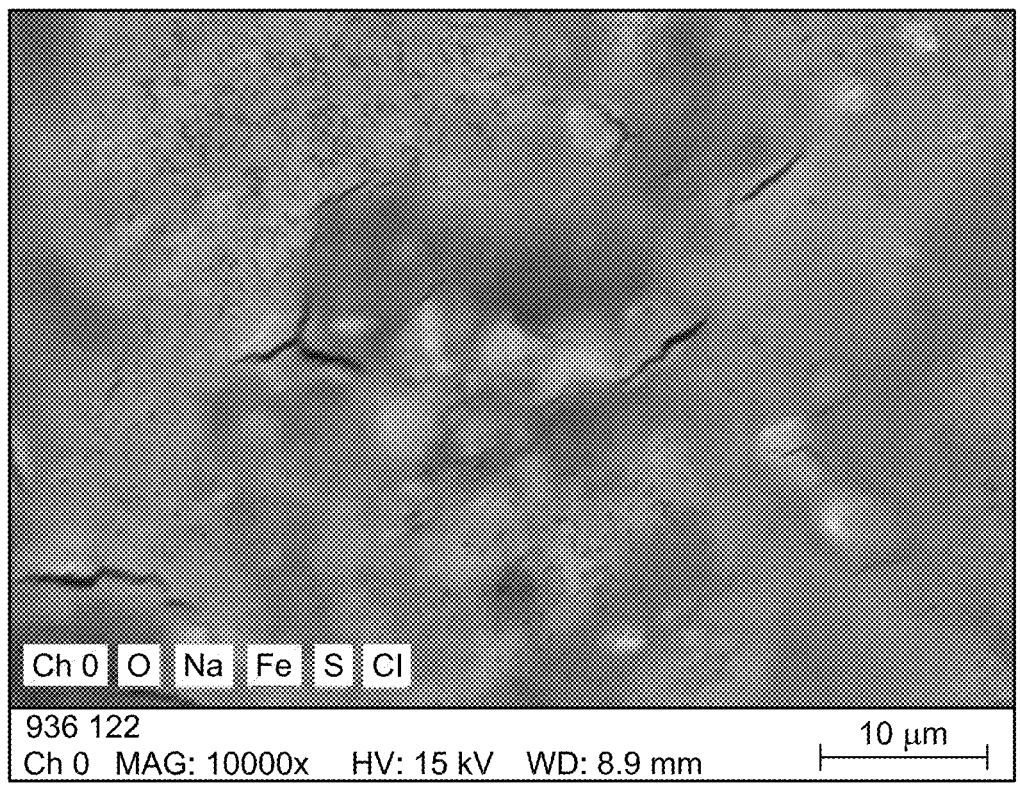
FIG. 10D shows EDX analysis of magnetite in dry conditions with EDTA treatment, prior to exposure to hydrogen gas, according to certain embodiments.
Figure 11A:
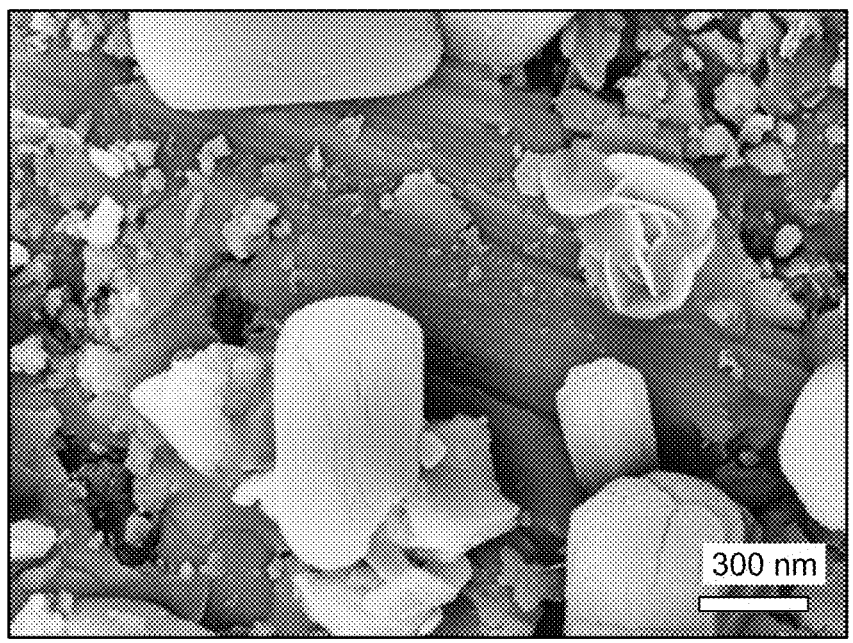
FIG. 11A is an SEM image magnetite in wet conditions without EDTA treatment prior to exposure to hydrogen gas, according to certain embodiments.
Figure 11B:
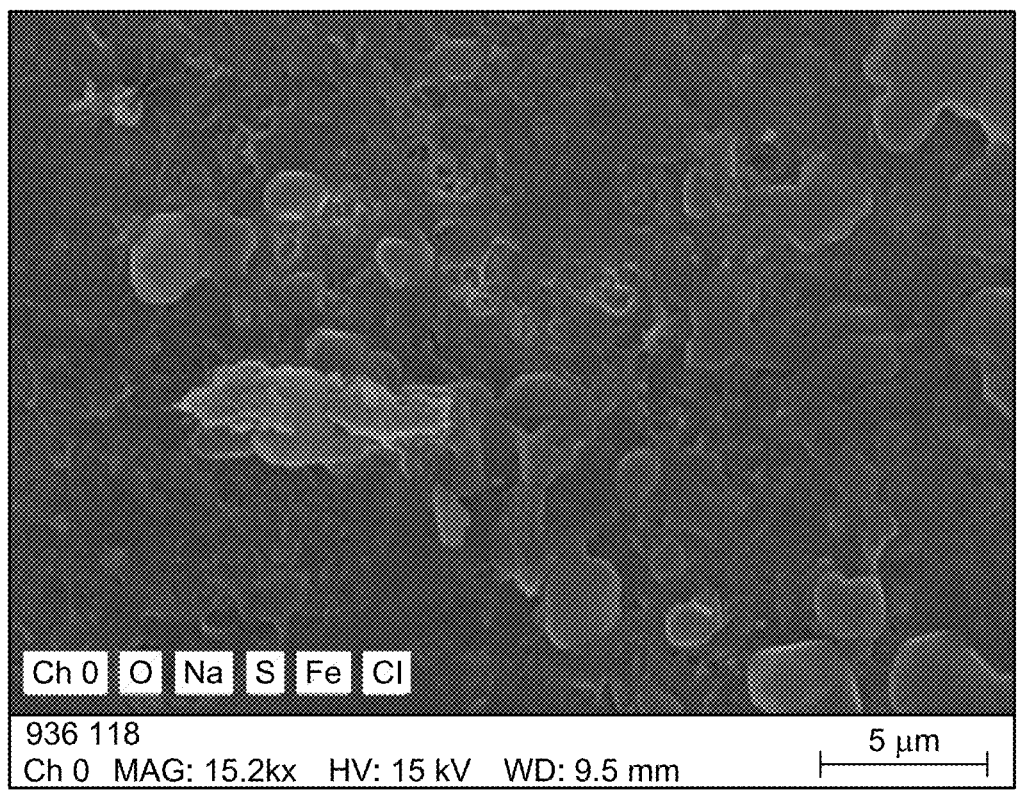
FIG. 11B shows EDX analysis of magnetite in wet conditions without EDTA treatment, prior to exposure to hydrogen gas, according to certain embodiments.
Figure 11C:
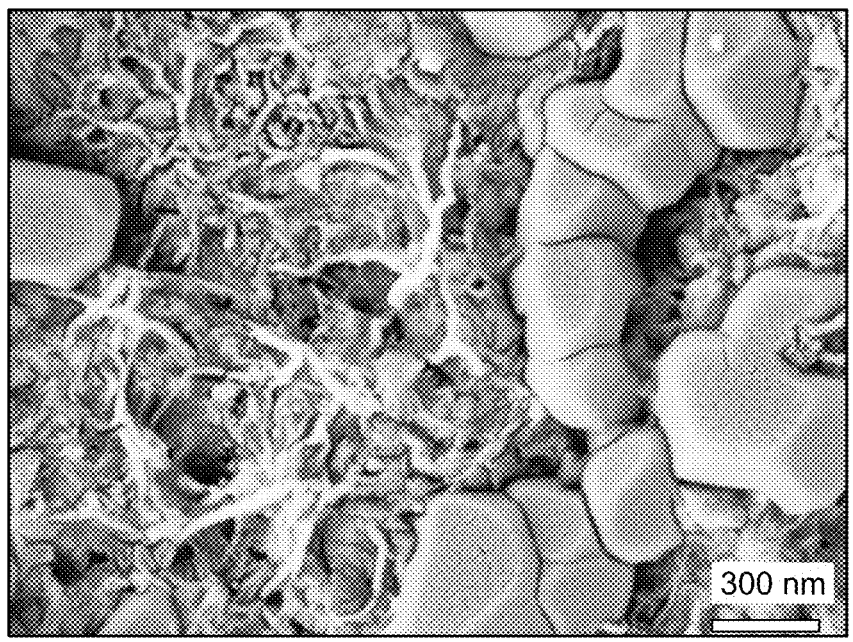
FIG. 11C is an SEM image of magnetite in wet conditions with EDTA treatment prior to exposure to hydrogen gas, according to certain embodiments.
Figure 11D:
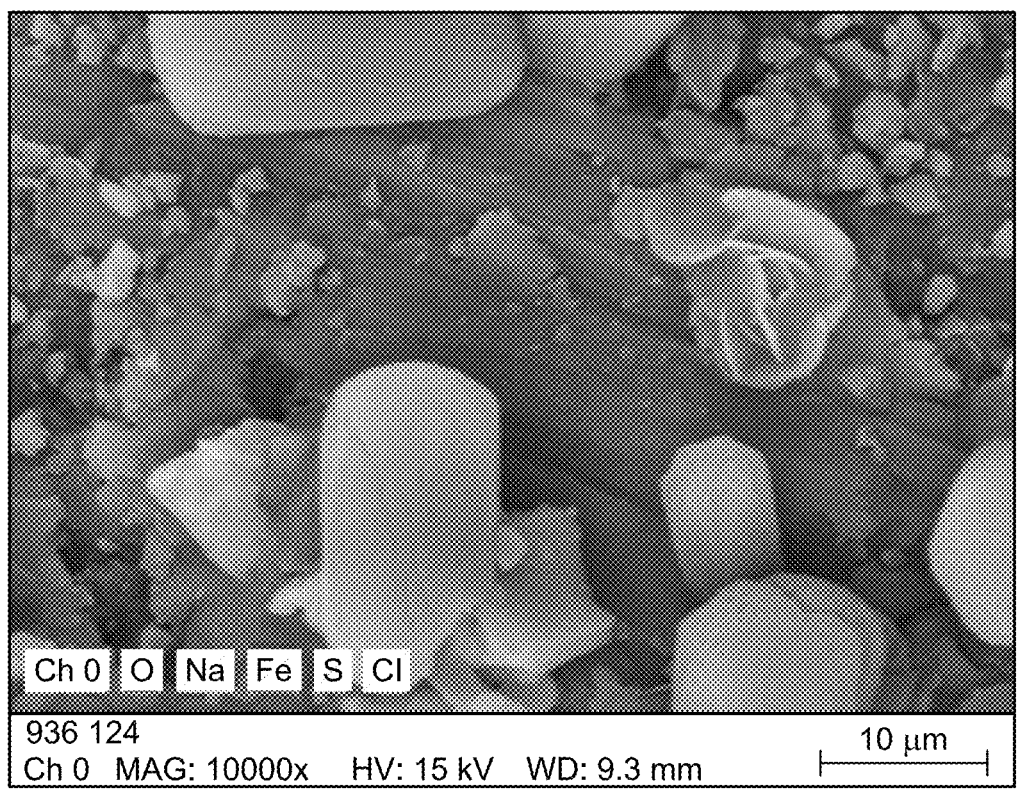
FIG. 11D shows EDX analysis of magnetite in wet conditions with EDTA treatment, prior to exposure to hydrogen gas, according to certain embodiments.

In the cases of dry conditions where the magnetite samples are exposed to hydrogen in the absence of brine, the results of the SEM analysis are shown in FIGS. 10A-10D. FIG. 10A depicts the case of magnetite exposure to hydrogen gas without EDTA treatment, and the corresponding EDX analysis is shown in FIG. 10B. As can be seen from FIG. 10A, the spots which covered the surface of the sample in FIG. 9A in the intact sample and presumed to be the hydrogen gas bonding sites have significantly reduced. This aligns with the aforementioned HI values, which reduced from 541, in FIG. 1D, in the intact sample to 161 in the case of exposure to hydrogen gas, as shown in FIG. 2. In the case where the magnetite sample is treated with DTA and dried before exposure to hydrogen gas under dry conditions, the SEM images reveal that the surface behaves differently as fewer spots are observed. Although the spots become larger compared to the case without EDTA treatment. This may corroborate the observation of the reduction of HI upon hydrogen gas exposure in dry cases. Thus, under dry conditions, the binding affinity of the hydrogen gas on the surface is reduced both with and without EDTA treatment in dry conditions. Additionally, the EDX images, as shown in FIGS. 10B-10C of the samples in the case with EDTA treatment show that the sample surface is dominated by iron and oxygen.

SEM analysis in the wet condition is shown in FIGS. 11A-11D, where the magnetite sample is immersed in brine and then exposed to hydrogen gas in the presence of brine. The presence of NaCl salt on the sample surface is observed in both the SEM images, shown in FIG. 11A and FIG. 11C, and the EDX images, shown in FIG. 11B and FIG. 11D. Moreover, in the case of the EDTA-treated sample, the created voids are apparent as a result of the treatment. EDTA treatment on iron minerals may chelate iron from the sample surface. Thus, the aforementioned HI may imply that the iron element is vital for the hydrogen binding affinity of the iron minerals. Thus, the removal of iron may reduce or serve as a retrieval mechanism for adsorbed hydrogen. Further, the SEM analysis aligns with the storage of hydrogen on magnetite surfaces in wet conditions and its retrieval by EDTA treatment.

Figure 12A:
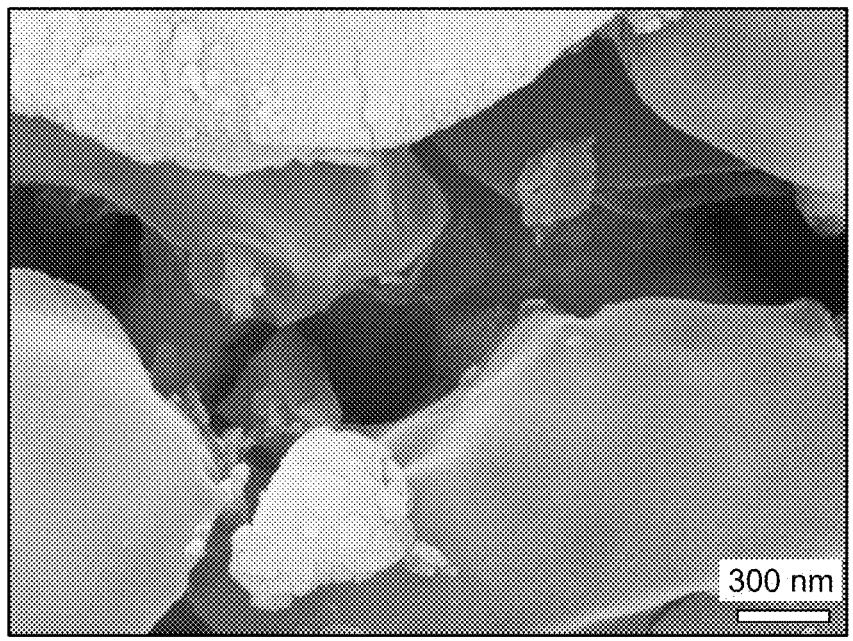
FIG. 12A is an SEM image of the intact pyrite, according to certain embodiments.
Figure 12B:
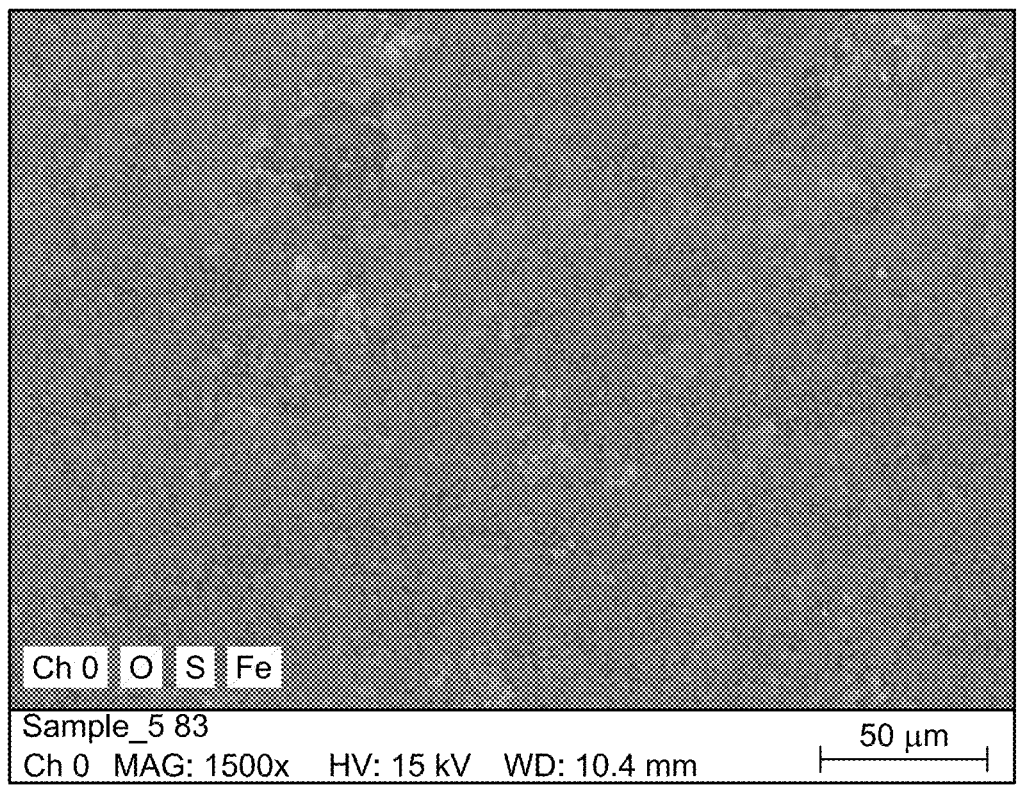
FIG. 12B shows EDX analysis for intact pyrite, according to certain embodiments.
Figure 13A:
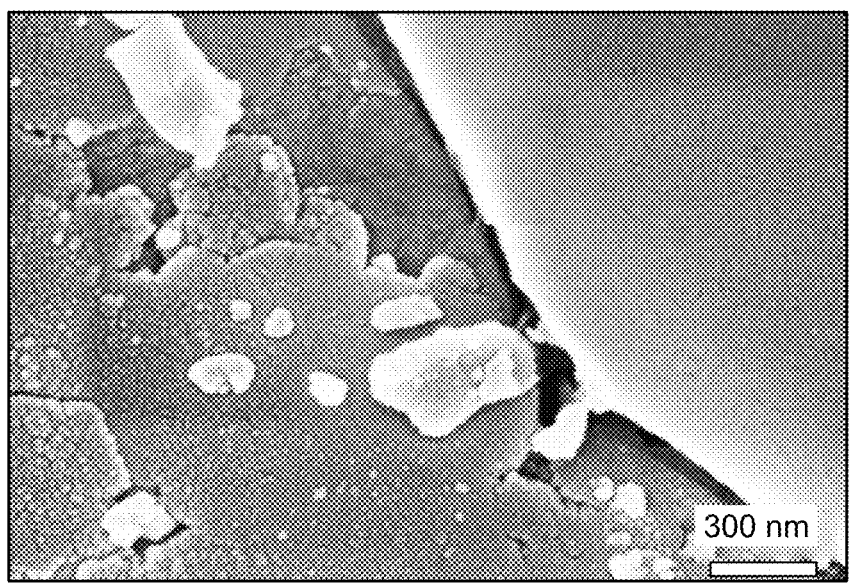
FIG. 13A is an SEM image of pyrite in dry conditions without EDTA treatment prior to exposure to hydrogen gas, according to certain embodiments.
Figure 13B:
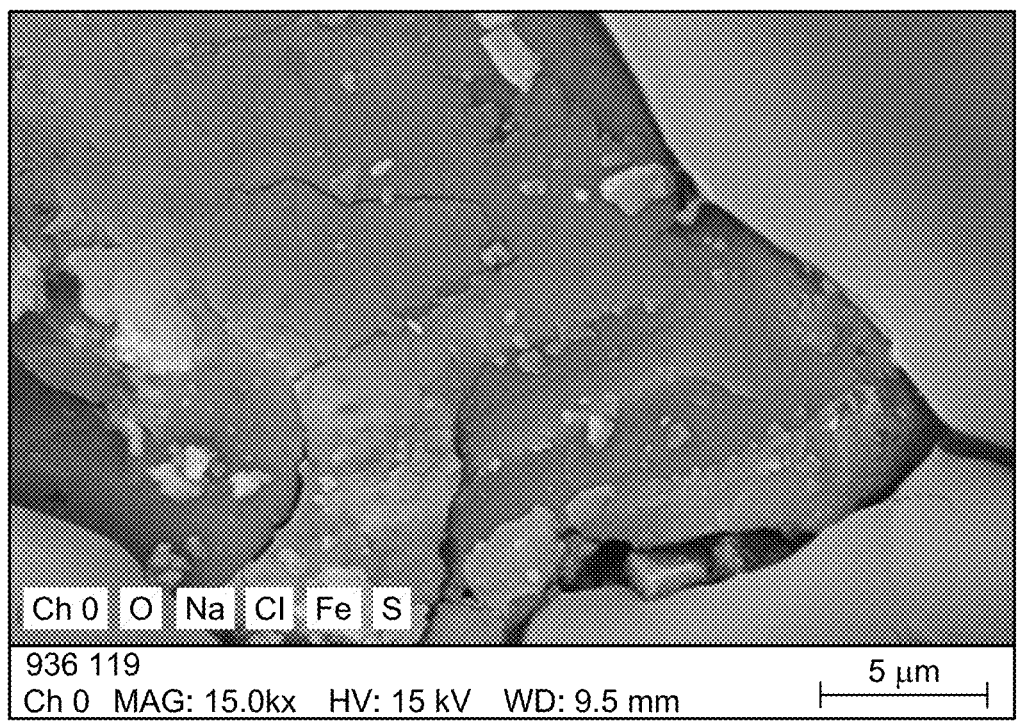
FIG. 13B shows EDX analysis of pyrite in dry conditions without EDTA treatment, prior to exposure to hydrogen gas, according to certain embodiments.
Figure 13C:
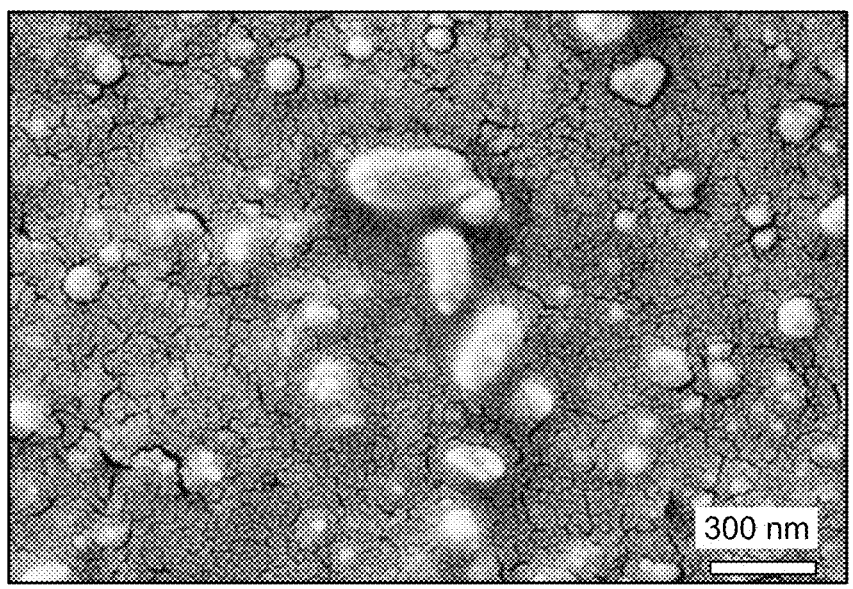
FIG. 13C is an SEM image pyrite in dry conditions with EDTA treatment, prior to exposure to hydrogen gas, according to certain embodiments.
Figure 13D:
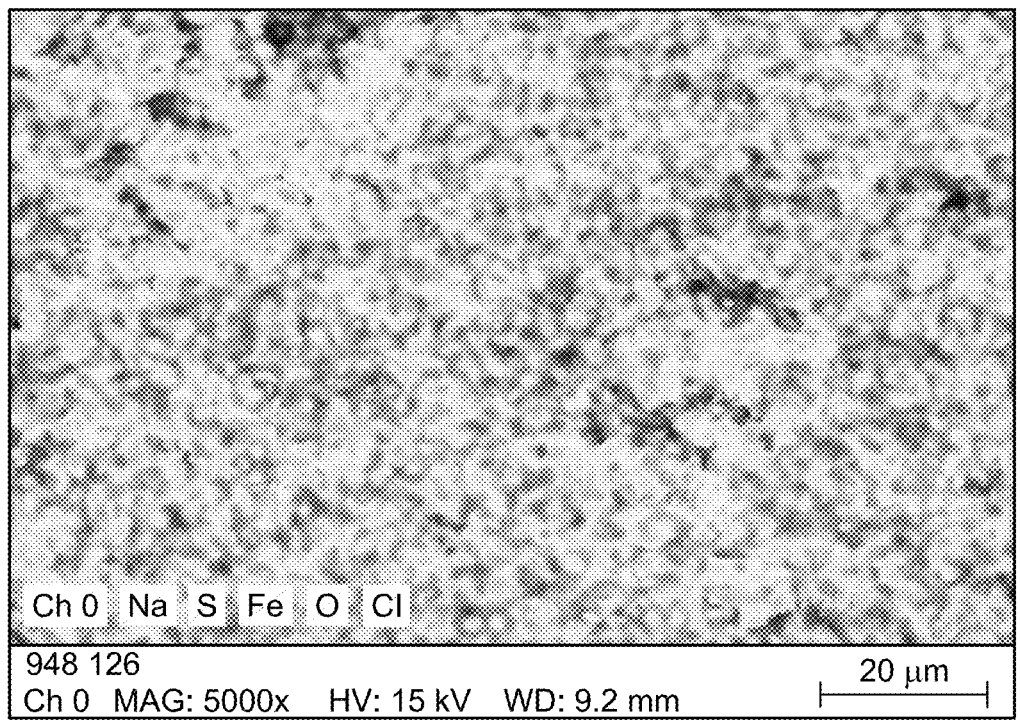
FIG. 13D shows EDX analysis of pyrite in dry conditions with EDTA treatment, prior to exposure to hydrogen gas, according to certain embodiments.

The SEM images of the intact pyrite sample and its EDX are shown in FIGS. 12A-12B. As can be seen from FIGS. 12A, the pyrite sample has relatively fewer spots. This supports the lower HI of 20 compared to 543 of magnetite in the native state. Further, as can be seen from FIG. 12B, the EDX analysis confirms the presence of iron and sulfur, which is the elemental composition of pyrite. SEM images of the pyrite sample exposed to hydrogen gas in the dry condition are shown in FIG. 13A-13D. As can be seen from FIG. 13A, the spots that were less in the native state further reduced in magnitude, thus, providing support to the reduction of the HI depicted in FIG. 4. When the samples were treated with EDTA prior to exposure to hydrogen gas, larger spots, as shown in FIG. 13C is seen on the sample surface, which corroborates the increase in HI from a value of 17 without treatment to 362 with treatment. Hence, the treatment of the samples with EDTA enhances the ability of the sample to adsorb hydrogen gas, and further, in order to release the gas, the sample needs to be in a dry state, which may be achieved otherwise. In addition, the EDTA treatment resulted in the creation of voids on the sample surface, as shown in FIG. 13C, compared to instances without treatment, as shown in FIG. 13B.

Figure 14A:
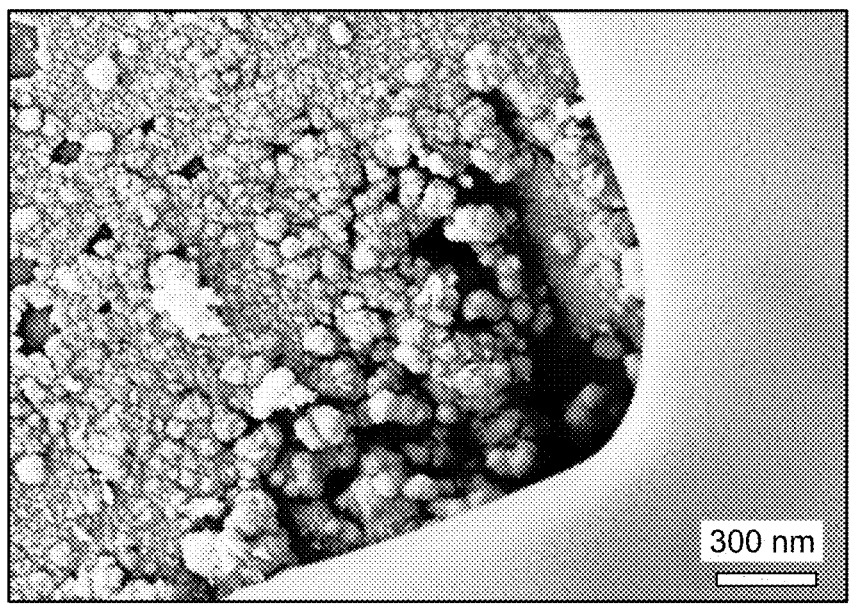
FIG. 14A is an SEM image of pyrite in wet conditions without EDTA treatment prior to exposure to hydrogen gas, according to certain embodiments.
Figure 14B:
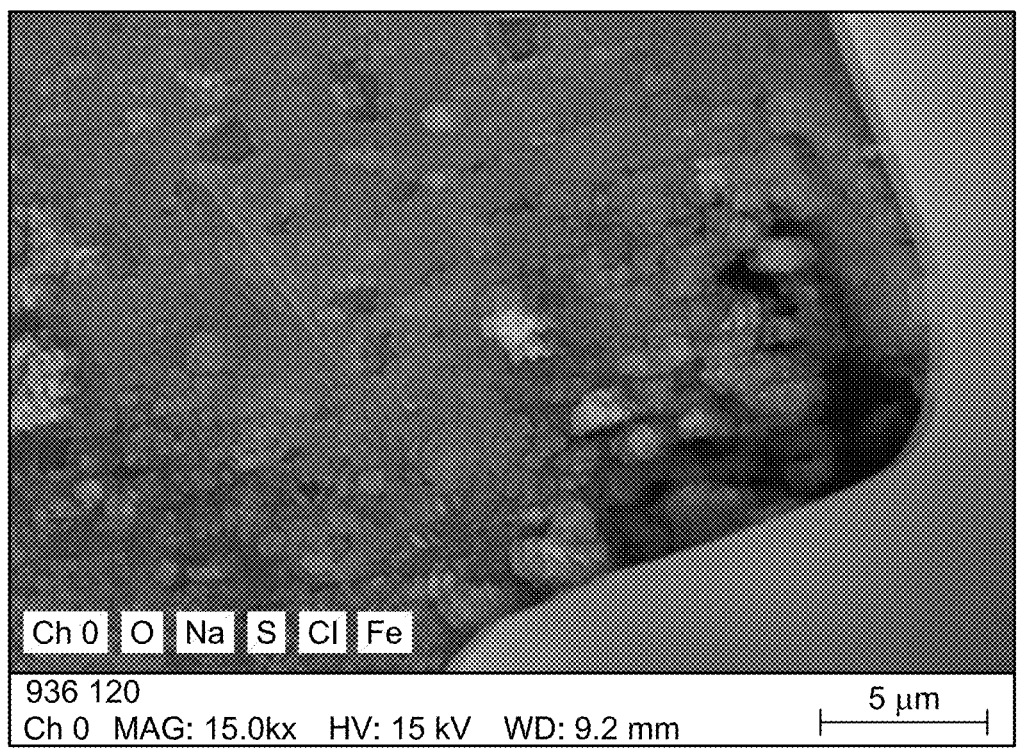
FIG. 14B shows EDX analysis of pyrite in wet conditions without EDTA treatment, prior to exposure to hydrogen gas, according to certain embodiments.
Figure 14C:
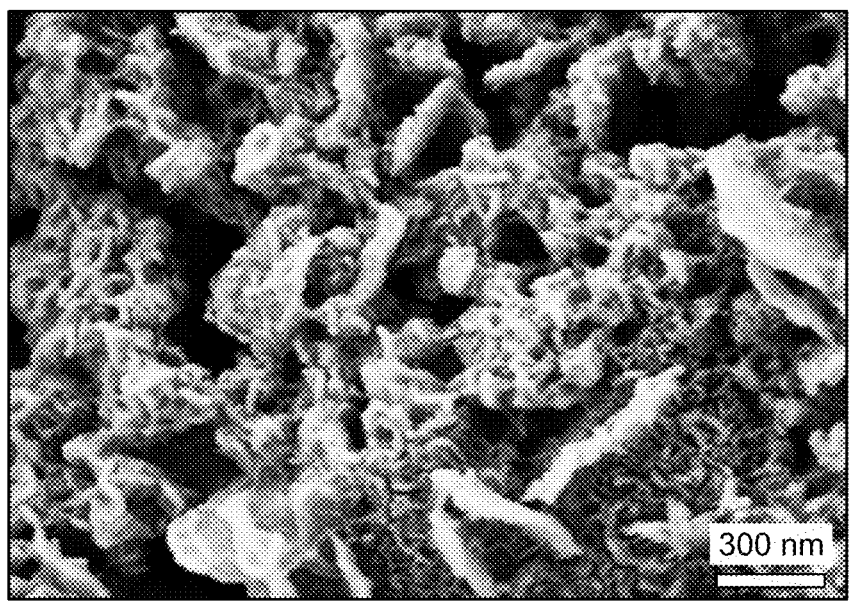
FIG. 14C is an SEM image pyrite in wet conditions with EDTA treatment, prior to exposure to hydrogen gas, according to certain embodiments.
Figure 14D:
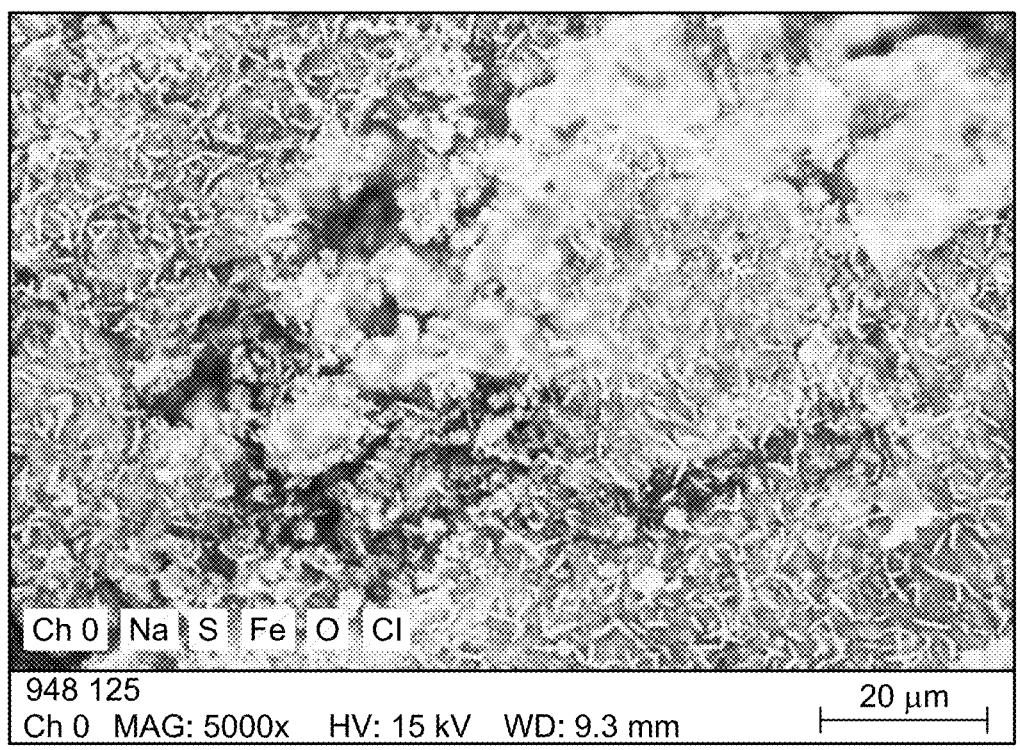
FIG. 14D shows EDX analysis of pyrite in wet conditions with EDTA treatment, prior to exposure to hydrogen gas, according to certain embodiments.

The SEM images of pyrite in the wet conditions are depicted in FIGS. 14A-14D. As can be seen from FIGS. 14A-14D, sodium chloride (NaCl) adsorption on the pyrite sample takes place. The coverage of the surface in the presence of brine in the case without EDTA treatment is shown in FIG. 14A may be responsible for the low adsorption of hydrogen on the pyrite surface. Further, as can be seen from FIG. 14C, the treated sample, when exposed to hydrogen, showed a high amount of hydrogen gas adsorption. Thus, in both the dry and the wet cases, pyrite samples, when treated with EDTA, resulted in increased hydrogen adsorption capacity. Therefore, the SEM and EDX analysis of the samples herein corroborates the discussed HI values above.

Aspects of the present disclosure provide a method for recovery and storage of hydrogen in a subterranean geological formation. Aspects of the present disclosure provide evaluation based on DFT calculations, and experimental analysis is used to support the assessment of the potential for hydrogen storage in formations rich in iron minerals by examining the interaction of iron minerals with hydrogen. Further, based on the findings from both the experimental data and the DFT calculations, it may be said that the present disclosure provides an effective and efficient method for the storage and recovery of hydrogen. Iron minerals, such as magnetite, pyrite, and hematite, may be utilized as hydrogen gas storage media. The ability for hydrogen to be adsorbed onto iron mineral surfaces is influenced by the state of the aforementioned minerals; in this regard, the state refers to whether the mineral is dry or in the presence of brine.

Furthermore, in the case of pyrite, the treatment with EDTA as a chelating agent may enhance hydrogen adsorption and in the case of magnetite, it may also be utilized for hydrogen recovery. Thus, chemical methods are used to recover hydrogen following adsorption. Hydrogen binds onto the iron mineral surfaces by forming covalent bonds and the order of binding affinity to the minerals is hematite >pyrite>magnetite. The binding affinity of hydrogen correlates with the HI reduction in the dry state. Several banded iron formations may be used to store hydrogen gas. Therefore, the present disclosure may be applied in diverse industries. Moreover, the hardness and the permeability of the sample are affected by its state, whether it is wet or dry. There is a relationship between the hardness of the sample and the quantity of hydrogen adsorbed on it. In addition, treatment of pyrite with hydrogen results in significant permeability increase.

Numerous modifications and variations of the present disclosure are possible in light of the above teachings. It is therefore to be understood that within the scope of the appended claims, the invention may be practiced otherwise than as specifically described herein.

The invention claimed is:

1. A method of hydrogen storage and recovery, comprising:
    injecting saline water into a subterranean gas storage cell in a subterranean geologic formation comprising magnetite;
    injecting a gas mixture comprising hydrogen gas at a positive pressure into the subterranean gas storage cell;
    storing a portion of the hydrogen gas in the magnetite under a storage condition; and
    desorbing a part of the portion of the hydrogen gas from the magnetite by injecting a chelating solution into the subterranean gas storage cell, wherein:
    the chelating solution includes at least one iron chelator selected from the group consisting of ethylenediaminetetraacetic acid (EDTA), ethyleneglycol-O, O'-bis(2-aminoethyl)-N, N,N', N'-tetraacetic acid (EGTA), N-(2-hydroxyethyl)ethylenediaminetriacetic acid (HEDTA), nitrilotriacetic acid (NTA), deferoxamine, deferasirox and deferiprone.

2. The method of claim 1, wherein:
the chelating solution comprises EDTA.

3. The method of claim 2, wherein:
the chelating solution comprises 0.1-2.0 mol. % of EDTA.

4. The method of claim 1, wherein:
the saline water comprises ions of $Na^+$, $Ca^{2+}$, $Mg^{2+}$, $SO_4^{2-}$, $Cl^-$ and $HCO_3^-$.

5. The method of claim 4, wherein the saline water comprises, by mass, ions of:
    $Na^+$: 5,000-50,000 parts per million (ppm);
    $Ca^{2+}$: 100-1,500 ppm;
    $Mg^{2+}$: 500-5,000 ppm;
    $SO_4^{2-}$: 1,000-9,000 ppm;
    $Cl^-$: 10,000-90,000 ppm; and
    $HCO_3^-$: 10-500 ppm.

6. The method of claim 5, wherein:
a volume of the saline water injected is 0.1-0.9 times of a volume the subterranean gas storage cell.

7. The method of claim 4, wherein:
the storage condition includes keeping the ions in the subterranean gas storage cell.

8. The method of claim 1, further comprising:
injecting the saline water and the gas mixture at a depth in the subterranean gas storage cell such that the subterranean gas storage cell has an average temperature of 60-150° C., wherein
the storage condition includes the average temperature of 60-150° C. of the subterranean gas storage cell.

9. The method of claim 1, wherein: the positive pressure is 100-2000 psi.

10. The method of claim 1, wherein:
the subterranean geologic formation comprises 70-100 mass % of magnetite based on a total mass of the subterranean geologic formation.

11. The method of claim 1, wherein:
the subterranean geologic formation comprises 50-90 mass % of $Fe_3O_4$ based on a total mass of the subterranean geologic formation.

12. The method of claim 11, wherein:
the subterranean geologic formation further comprises 20-35 mass % of $SiO_2$ based on a total mass of the subterranean geologic formation.

* * * * *